United States Patent [19]
Tamai

[11] Patent Number: 5,938,720
[45] Date of Patent: *Aug. 17, 1999

[54] ROUTE GENERATION IN A VEHICLE NAVIGATION SYSTEM

[75] Inventor: Haruhisa Tamai, Saitama, Japan

[73] Assignee: Visteon Technologies, LLC, Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/784,204

[22] Filed: Jan. 15, 1997

Related U.S. Application Data

[63] Continuation-in-part of application No. 08/385,611, Feb. 9, 1995, Pat. No. 5,712,788.

[51] Int. Cl.[6] .............................. G06G 7/78; G06F 165/00
[52] U.S. Cl. ........................ 701/209; 701/200; 701/201; 701/202; 701/208; 701/210; 701/211
[58] Field of Search .................................... 701/200, 201, 701/202, 208, 209, 210, 211; 340/988, 990; 34/995; 73/178 R

[56] References Cited

U.S. PATENT DOCUMENTS

| | | | |
|---|---|---|---|
| 3,845,289 | 10/1974 | French .................................. | 235/151.2 |
| 4,570,227 | 2/1986 | Tachi et al. .............................. | 364/444 |
| 4,608,656 | 8/1986 | Tanaka et al. ........................... | 364/449 |
| 4,611,293 | 9/1986 | Hatch et al. ............................. | 364/571 |
| 4,672,565 | 6/1987 | Kuno et al. .............................. | 364/571 |
| 4,673,878 | 6/1987 | Tsushima et al. ....................... | 324/226 |
| 4,734,863 | 3/1988 | Honey et al. ............................ | 364/449 |
| 4,737,218 | 4/1988 | Hasebe et al. ........................... | 364/449 |
| 4,751,512 | 6/1988 | Longaker ................................. | 342/357 |
| 4,774,672 | 9/1988 | Tsunoda et al. ......................... | 364/449 |
| 4,782,447 | 11/1988 | Ueno et al. .............................. | 364/449 |
| 4,796,191 | 1/1989 | Honey et al. ............................ | 364/450 |
| 4,797,841 | 1/1989 | Hatch ................................. | 364/571.04 |
| 4,831,563 | 5/1989 | Ando et al. ......................... | 364/571.05 |
| 4,862,398 | 8/1989 | Shimizu et al. .................... | 365/571.05 |

(List continued on next page.)

FOREIGN PATENT DOCUMENTS

| | | |
|---|---|---|
| 0 485 120 A2 | 5/1992 | European Pat. Off. . |
| 0 575 943 A1 | 12/1993 | European Pat. Off. . |
| 2 271 423 | 4/1994 | United Kingdom . |

OTHER PUBLICATIONS

French, *MAP Matching Origins Approaches and Applications*, Rober L. French & Associates, 3815 Libson St., Suite 201, Fort Worth, Texas 76107, USA, pp. 91–116.

*Primary Examiner*—William A. Cuchlinski, Jr.
*Assistant Examiner*—Arthur Donnelly
*Attorney, Agent, or Firm*—Beyer & Weaver, LLP

[57] ABSTRACT

Methods and apparatus for generation of a route from a source location to a final destination are described. According to one embodiment, a two-ended search is performed based on the principles of the A* algorithm. That is, two routes are simultaneously generated, one from the source to the destination, and one from the destination to the source. According to another embodiment, a route generation algorithm determines when to stop searching for route candidates. The algorithm searches a map database for a first number of iterations thereby generating a first route candidate. After generation of the first route candidate, searching of the map database is terminated after a second number of additional iterations. A best route candidate is then selected as the route.

30 Claims, 18 Drawing Sheets

U.S. PATENT DOCUMENTS

| | | | |
|---|---|---|---|
| 4,914,605 | 4/1990 | Loughmiller, Jr. et al. | 364/518 |
| 4,918,609 | 4/1990 | Yamawaki | 364/449 |
| 4,926,336 | 5/1990 | Yamada | 364/444 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 2/1991 | Nimura et al. | 364/444 |
| 4,996,645 | 2/1991 | Van DerZon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kakihara et al. | 364/449 |
| 5,060,162 | 10/1991 | Ueyama et al. | 364/449 |
| 5,177,685 | 1/1993 | Davis et al. | 364/443 |
| 5,220,507 | 6/1993 | Kirson | 364/444 |
| 5,272,638 | 12/1993 | Martin et al. | 364/449 |
| 5,283,743 | 2/1994 | Odagawa | 364/457 |
| 5,285,391 | 2/1994 | Smith, Jr. et al. | 364/443 |
| 5,287,297 | 2/1994 | Ihara et al. | 364/571.02 |
| 5,297,050 | 3/1994 | Ichimura et al. | 364/444 |
| 5,315,298 | 5/1994 | Morita | 340/995 |
| 5,369,588 | 11/1994 | Hayami et al. | 364/449 |
| 5,410,485 | 4/1995 | Ichikawa | 364/449 |
| 5,412,573 | 5/1995 | Barnea et al. | 364/449 |
| 5,422,815 | 6/1995 | Hijikata | 364/449 |
| 5,463,554 | 10/1995 | Araki et al. | 364/449 |
| 5,486,822 | 1/1996 | Tenmoku et al. | 364/449 |
| 5,506,774 | 4/1996 | Nobe et al. | 364/449 |
| 5,508,930 | 4/1996 | Smith, Jr. | 364/444 |
| 5,513,110 | 4/1996 | Fujita et al. | 364/444 |
| 5,519,619 | 5/1996 | Seda | 364/444 |
| 5,521,826 | 5/1996 | Matsumoto | 364/449 |
| 5,657,231 | 8/1997 | Nobe et al. | 364/449 |
| 5,684,704 | 11/1997 | Okazaki | 364/444.2 |

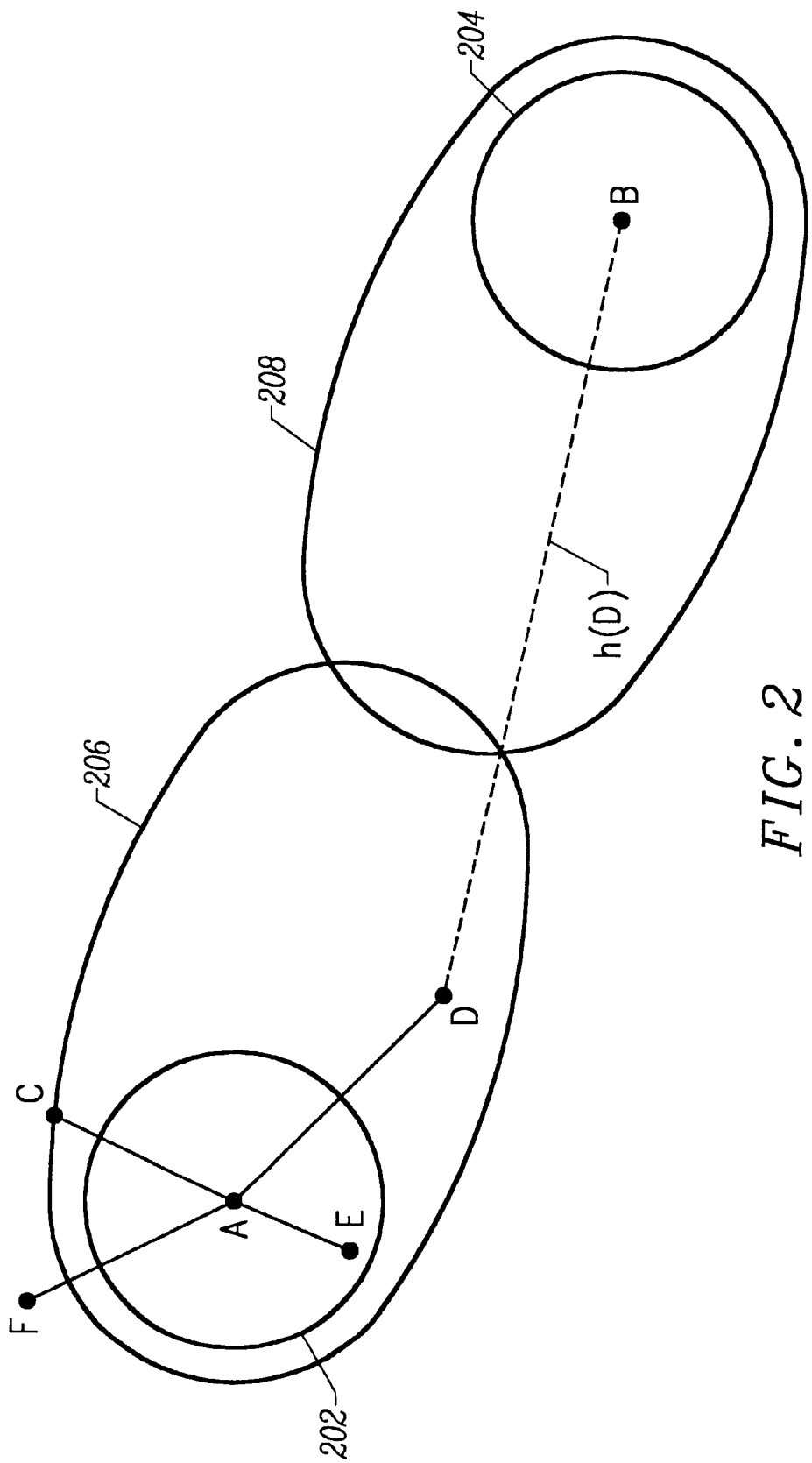

ROUTE GENERATION IN A VEHICLE NAVIGATION SYSTEM

CONTINUING APPLICATION DATA

This application is a continuation-in-part of commonly assigned, U.S. patent application Ser. No. 08/385,611 now U.S. Pat. No. 5,712,788 entitled INCREMENTAL ROUTE CALCULATION, filed on Feb. 9, 1995.

BACKGROUND OF THE INVENTION

The present invention relates to the determination of routes by a vehicle navigation system. More specifically, the invention provides various methods and apparatus for efficiently determining an optimal route to a user's final destination. According to various embodiments of the invention, the user may begin driving before the entire route to the final destination has been determined due to the generation of one or more intermediate routes. In addition, the present invention provides methods and apparatus for quickly generating an optimal route to the final destination, "seaming" the optimal route with the intermediate route, and determining a termination point for the intermediate route. Also described herein is a method and apparatus for optimizing route generation in a grid pattern region.

As the coverage and feature density of available map databases increase, the time required for the generation of long distance routes has correlatively increased. For particularly long or complex routes, undesirable delays may be experienced before the user may leave her initial location. If the user decides to leave before the route has been generated, she will be operating without instructions from the navigation system and will likely depart from the eventually generated route, thereby rendering the route generation useless. The above-described effects of long route generation time could be mitigated if there were a way in which the first few instructions or maneuvers could be determined and communicated to the user before the entire route generation is complete.

In addition, because the time required for route generation is so long, it is desirable to provide alternatives to current route generation methods which reduce this overhead. To determine a route to a destination, currently available vehicle navigation systems typically employ a search algorithm based on the well known artificial intelligence (AI) graph search technique referred to as "A*". A* is described in *Principle of Artificial Intelligence*, Nilsson, Nils J., 1993; ISBN 0-934613-10-9, which is incorporated herein by reference. In general, A* performs a directed, breadth-first search through the graph, i.e., map database, from the source to the destination, building a tree of possible solution paths as it progresses, the root of the tree being the source segment. The A* algorithms iterates by determining all of the nearest connected segments to each "branch" or tree segment beginning with the source segment. A cost (f(n)) for each segment is then determined according to the formula $$f(n)=g(n)+h(n) \quad (1)$$

with g(n) representing the known cost from the source segment to segment n, and h(n) representing the heuristic cost from segment n to the destination. The heuristic cost is essentially an intelligent guess of the actual cost from segment n to the destination. The segment with the lowest overall cost is then selected as part of the route and the algorithm continues until a segment corresponding to the desired destination is selected. The use of the cost formula in equation (1) has the effect of progressively narrowing the search area toward the destination. However, because the route generation times using the unmodified A* algorithm are still fairly long, it remains desirable to provide route generation solutions which mitigate the undesirable effects of this overhead.

SUMMARY OF THE INVENTION

The present invention provides methods and apparatus for generation of a route from a source location to a final destination which have a number of advantages over the well known A* graph search algorithm described above. According to one embodiment, a two-ended search is performed based on the principles of the A* algorithm. That is, two routes are simultaneously generated, one from the source to the destination, and one from the destination to the source.

According to another embodiment, the route generation algorithm of the invention determines when to stop searching for route candidates. The algorithm searches a map database for a first number of iterations thereby generating a first route candidate. After generation of the first route candidate, searching of the map database is terminated after a second number of additional iterations which may or may not yield additional route candidates. A best route candidate is then selected as the route.

According to another embodiment, the route generation algorithm makes searching of the map database more efficient by excluding certain types of road segments from the searchable population. The algorithm searches the map database for a plurality of iterations thereby generating one or more route candidates. While searching the database, the algorithm identifies a first road segment having a first rank associated therewith. Once such a road segment is identified, all other road segments having ranks below the first rank are excluded from subsequent searching. A best route candidate is then selected from among the route candidates.

According to still another embodiment, the route generation algorithm of the present invention manipulates the characteristics of the search region used to search the map database, thereby tailoring the search region to correspond to the characteristics of the specific region of the database being searched. The algorithm expands the search region to search the map database for the road segments to be included in the generated route. The search region has at least one parameter associated therewith. While searching the map database, the algorithm determines whether the search region encompasses a portion of the map database characterized by a grid pattern. If it does, the parameter associated with the search region is manipulated. The parameter may be, for example, the size of the search region. In this way, the size of the search region may be adjusted to account for the digitization density of a particular map region.

The present invention also provides a way in which an intermediate route may be determined to some location between a vehicle's initial starting location and the desired destination. Typically, the user of a vehicle navigation system does not want to wait around for an entire route to be calculated before leaving the starting location. Therefore, the present invention generates a partial route to some intermediate location, and communicates the maneuvers necessary to reach the intermediate location to the user, while simultaneously generating the remainder of the route to the desired destination. The determination of the partial route, being much less computationally intense than the generation of the entire route, requires only a few seconds, thereby allowing the user to begin driving before the entire route is known.

According to various specific embodiments, methods and apparatus are provided for seaming, i.e., connecting, two partial routes together to form a single route. According to one embodiment, the system generates the first and second routes which are connected at a connection point, thereby forming a combined route. A replacement route is then generated from a source point on the first route near the connection point to a destination point on the second route near the connection point. The portion of the single route between the source and destination points is then replaced with the replacement route. According to another embodiment, the system determines whether the first and second routes intersect at an intersection point. Where the first and second routes do intersect, unnecessary portions of the combined route coupled to the intersection point are removed. This "smooths" over any anomalous route configurations at the original connection point.

According to various specific embodiments, methods and apparatus are provided for generating partial routes and for terminating partial route generation. According to one embodiment, the map database is searched to generate a plurality of partial route candidates, each having a travel cost and a heuristic cost associated therewith. The searching of the database is terminated where the travel cost associated with at least one of the partial route candidates reaches a threshold value. The partial route candidate having the lowest heuristic cost is then selected as the partial route. According to another embodiment, partial route generation is terminated upon selection as part of a partial route a road segment which provides access to a limited access road. A second road segment in the partial route is then identified from which access to both directions of the limited access road is possible. Any road segments in the partial route beyond the second road segment are then removed. According to a more specific embodiment, the algorithm's search region is expanded until a portion of a limited access road is selected as part of a partial route. The algorithm then terminates expansion along the limited access road but continues expansion in at least one other direction until a second limited access road is encountered.

According to yet another embodiment of the invention, methods and apparatus are described herein for providing route guidance to the user of a vehicle navigation system. The system generates a route and a first plurality of maneuver instructions corresponding to a first portion of the route. The first plurality of maneuver instructions are then communicated to the user via a user interface. A second plurality of maneuver instructions corresponding to the remainder of the route are generated after communication of the first maneuver instructions begins.

According to still another embodiment of the invention, methods and apparatus are provided for route generation which favor inclusion of a particular type of road, e.g., a freeway, in the generated route. The system's map database is searched thereby generating at least one route candidate. While the algorithm is searching the database, a cost associated with each of a plurality of selected road segments is dynamically adjusted to favor inclusion of the particular road segment type in the route.

A further understanding of the nature and advantages of the present invention may be realized by reference to the remaining portions of the specification and the drawings.

BRIEF DESCRIPTION OF THE DRAWINGS

FIG. 2 is a diagram which serves to illustrate the route generation methodology employed by a vehicle navigation system designed according to a specific embodiment of the invention;

DESCRIPTION OF THE PREFERRED EMBODIMENT

The present invention relates generally to commonly assigned U.S. Pat. No. 5,345,382 to Kao for CALIBRATION METHOD FOR A RELATIVE HEADING SENSOR, U.S. Pat. No. 5,359,529 to Snider for ROUTE GUIDANCE ON/OFF-ROUTE STATE FILTER, U.S. Pat. No. 5,374,933 to Kao for POSITION CORRECTION METHOD FOR VEHICLE NAVIGATION SYSTEM, and U.S. Pat. No. 5,515,283 to Desai et al. for METHOD FOR IDENTIFYING HIGHWAY ACCESS RAMPS FOR ROUTE CALCULATION IN A VEHICLE NAVIGATION SYSTEM, the entire specifications of which are incorporated herein by reference.

System Environment

Figure 1:
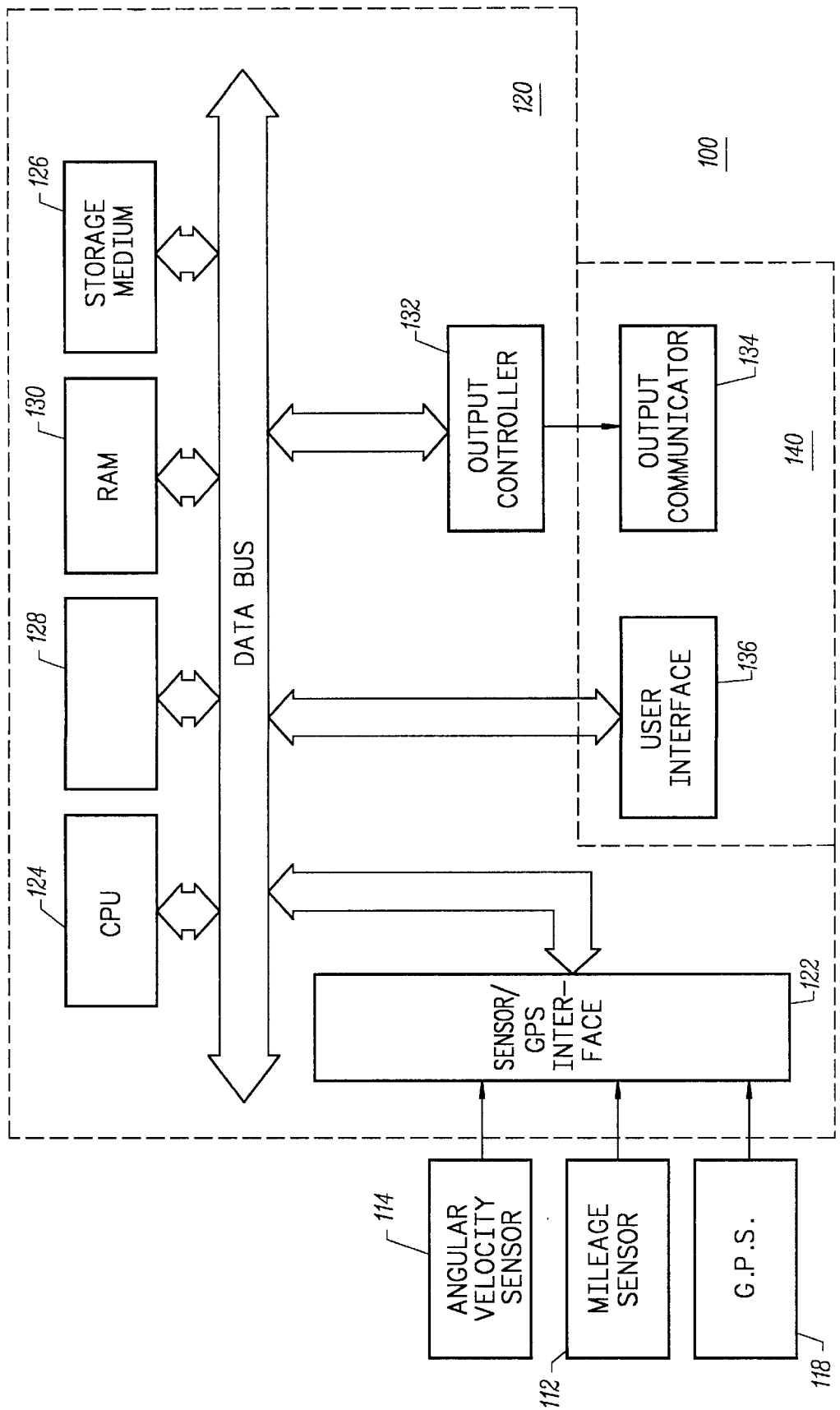
FIG. 1 is a block diagram of a vehicle navigation system for use with the present invention.

FIG. 1 is a block diagram of a specific embodiment of a vehicle navigation system 100 for use with the present invention. Sensors 112 and 114 and GPS receiver 118 are coupled to computing means 120 through sensor/GPS interface 122. In typical embodiments, mileage sensor 112 comprises an odometer, and angular velocity sensor 114 comprises a gyroscope, or a differential odometer coupled to the wheels of the vehicle. A global positioning system (GPS) data receiver 118 is provided for receiving signals from, for example, a satellite-based navigation system. Data from sensor/GPS interface 122 is transmitted to CPU 124, which performs calibration, signal processing, dead-reckoning, vehicle positioning, and route guidance functions. A database containing map information may be stored in database medium 126, with software directing the operation of computing means 120 stored in main memory 128 for execution by CPU 124. Memory 128 may comprise read-only memory (ROM), or reprogrammable non-volatile memory such as flash memory or SRAM. System RAM 130 permits reading and writing of the information necessary to execute such software programs. Database medium 126 may comprise non-volatile memory, a hard disk drive, CD-ROM, or an integrated circuit in which digitized map information has been stored. Output controller 132, which may comprise a graphics controller, receives data processed by CPU 124 and transmits the data to display console 140 which includes output communicator 134, usually comprising a display screen. The user may input data, such as a desired destination, through user interface 136, typically comprising a keyboard.

The map database stored in database medium 126 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a road rank value which relates to the category or type of the road. For example, the highest level category of the hierarchy, i.e., rank 3, includes freeways and expressways. The lowest level, i.e., rank 0, includes residential streets and/or alleys.

Route Generation

The present invention takes advantage of the manner in which the map database is organized to efficiently generate the best route from a source location to a final destination. The determination of a route from a source location A to a final destination B using the vehicle navigation system of FIG. 1 will be described with reference to FIG. 2. According to a specific embodiment of the invention, vehicle navigation system 100 employs a two-ended route generation algorithm. That is, the system explores paths emanating from source point A and paths leading backwards from destination point B. The two searches each generate a plurality of partial routes, two of which eventually meet somewhere between points A and B to form a single route.

Initially, the search patterns emanate from both points A and B in all directions as indicated by circular regions 202 and 204. The diagram of FIG. 2 illustrates how one of four road segments emanating from point A is chosen for continued route exploration. Each road segment, n, has an associated segment cost, g(n), and each node, k, has associated node and heuristic costs, g(k) and h(k), respectively. The segment cost for each segment is added to the node and heuristic costs for its endpoint to obtain an overall cost value for each. The road segment having the lowest overall cost is then selected for further generation. In FIG. 2, the road segment terminating at point D is selected primarily because the heuristic cost associated with point D, i.e., the distance between points D and B, is less than the heuristic costs associated with points C, E, and F. This process is then repeated for point D, and each newly generated route point thereafter. This has the effect of redirecting and narrowing the search area over the course of the route generation so that the search concentrates more on the area between points A and B as indicated by regions 206 and 208.

Iteration Termination Count

According to a particular embodiment of the invention, after a first route is generated using the technique described above (or any of a wide variety of route generation techniques), the system waits for one of two events to occur before termination of the route generation algorithm. One of the two events is the generation of a programmable number of routes between the source and the destination. For example, according to one specific embodiment, the programmable route count is four. In this embodiment, once four routes have been generated, the system communicates the route with the lowest cost to the user.

The other of the two events is when a parameter called the iteration termination count reaches zero. After the first route has been generated, the iteration termination count is decremented for each segment expansion executed by the route generation algorithm while searching for additional routes. The initial value of the iteration termination count may be set in a variety of ways according to various specific embodiments of the invention. According to one embodiment, the initial iteration termination count is fixed at 500 iterations. That is, the route generation algorithm expands at least one partial route an additional 500 segments before terminating its search. However, such a fixed initial count may not be appropriate for all route generation problems because it does not take into account the great variability in route lengths. For example, while an initial iteration termination count of 500 might be appropriate for a source and destination which are 2 miles apart, it will likely be insufficient for a source and destination which are a 25 miles apart. In addition, an initial count which is appropriate for a sparsely digitized area (e.g., a rural region), may not provide a sufficient number of additional iterations in a densely digitized area (e.g., a downtown urban region).

Thus, according to two alternate embodiments, the initial value of the iteration termination count may be variable. In a first embodiment, the initial count is dependent upon the distance between the source and the destination locations. That is, the greater the distance between the source and destination, the higher the initial count is set. In a second embodiment, the initial count is dependent upon the number of segment expansions required to generate the first route. That is, the greater the number of segments in the first generated route, the higher the initial count is set. In this way, the initial iteration termination count may be tailored to each specific route generation problem.

Any of the iteration termination count embodiments described above may be further enhanced such that the count is decremented by a bonus amount each time an additional route from the source to destination is generated. For example, in addition to decrementing the count by one for each segment expansion, it may also be decremented by, for example, 50 for each route generated after the first route. Thus, as the number of generated routes increases and the need for further searching correlatively decreases, the iteration termination count is adjusted to reflect this. According to specific embodiments, the bonus amount by which the count is adjusted may vary according to the distance between the source and the destination, or the number of segments in the first generated route.

Variable Segment Costs

Figure 3A:
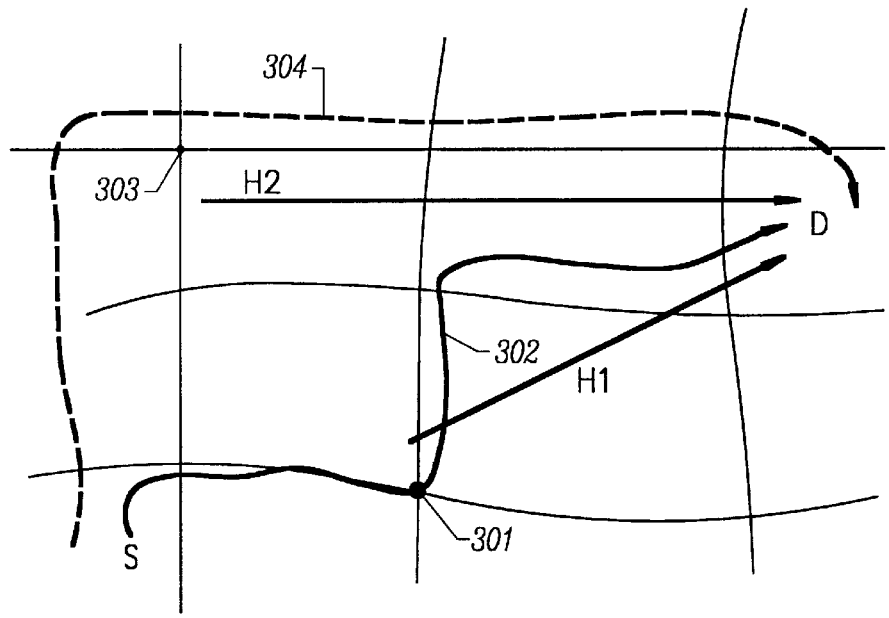
FIGS. 3A and 3B are diagrams illustrating the dynamic adjustment of segment costs.

The above-described route generation method may be enhanced to address the problem illustrated by FIG. 3A. Because the heuristic cost at node 301 (represented vector H1) is less than the heuristic cost at node 303 (represented by vector H2), route 302 is more likely to be generated than route 304. This occurs even where route 304 is an obviously superior route, e.g., because it primarily comprises road segments of rank 3, i.e., freeways. Therefore, according to a specific embodiment of the invention, heuristic costs are dynamically adjusted and weighted to favor the use of higher rank road segments in the generation of a route. For example, in one embodiment, the heuristic cost for a particular node is determined by multiplying the distance between the node and the destination by a constant corresponding to the rank of the associated road segment. The constants associated with the ranks increase in value from the highest to the lowest rank, thereby favoring the higher rank segments. According to another embodiment, heuristic costs are dynamically adjusted and weighted to favor the use of road segments based on their importance.

Figure 3B:
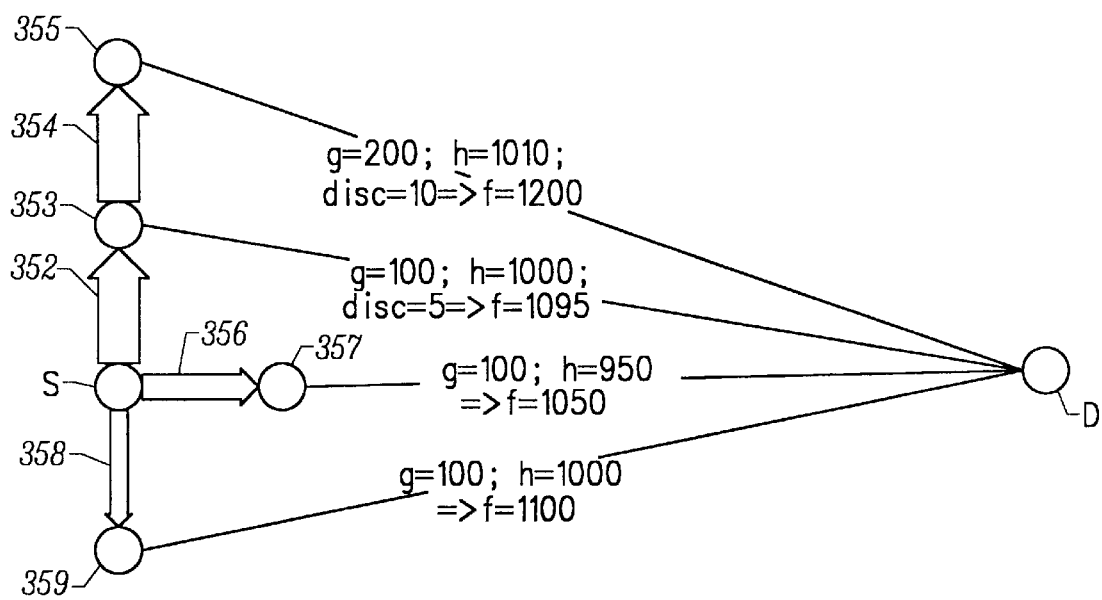

Manipulation of the heuristic or h cost may not be particularly useful where the destination is very far from the source (e.g., 300 miles) because, where the manipulation comprises multiplying the h cost by some constant (e.g., 0.9), the size of the h cost in comparison with the g cost (e.g., h=20,000 vs. g=100) may result in disproportionate adjustment of the total segment cost f, i.e., g+h. Therefore, according to a more specific embodiment of the invention, the segment cost f is adjusted to favor the use of higher rank segments by introduction of a discount value which is calculated as a percentage of the route g cost up to that point. FIG. 3B shows four road segments emanating from a source S. The larger segments 352 and 354 represent freeway segments. The smaller segments 356 and 358 represent surface street segments. The f cost associated with each segment and the components thereof are given on the line connecting the associated end point node and the destination D. So, for example, the f cost for segment 356 is the g cost (100), plus the h cost (950) as determined by the distance between node 357 and D. This yields a total of 1050. Likewise, for segment 358 and node 359, the f cost is 1100. However, because segments 352 and 354 (and the associated nodes 353 and 355) are part of a freeway, the f cost is decreased by a 5% discount. Of course, the discount could be any of a range of values without departing from the scope of the invention. In any case, as shown in FIG. 3B, the f costs associated with segments 352 and 354 are 1095 and 1200, respectively. It will be understood that in the example of FIG. 3B that the route generation algorithm would initially favor segment 356 because it has the lowest f cost. However, it will also be understood that, as the algorithm expands each of three directions, the discount associated with the freeway route (which includes segments 352 and 354) will increase as the cumulative g cost for that route increases. Therefore, the algorithm may eventually reach a point at which the f cost for the freeway route is less than the f cost for the route beginning with segment 356. In this way, as the route generation algorithm gets farther from the source location, it will tend to favor the route having more higher rank segments.

It will be understood that the dynamic adjustment of heuristic and total segment costs may also be employed with the incremental route generation embodiments described below.

Rank Suppression

Another embodiment provides a further enhancement to the two-ended search algorithm described above. According to this embodiment, once the search algorithm identifies a road segment to be included in the route which is of a higher rank than the previous road segment, road segments of the lower rank are ignored for subsequent route searching. This may be done for both ends of the search. This technique greatly reduces the number of road links which must be included in the search, thereby providing a correlative reduction in route generation time. This feature reflects the fact that the most logical routes generally increase road categories at the beginning and decrease road categories at the end. For example, a typical route might start on a residential street, move onto a major road, and then onto a freeway. The user would most likely remain on the freeway until she is near the final destination, at which point she would exit the freeway onto a major road, and then end up on a residential street.

Figure 4:
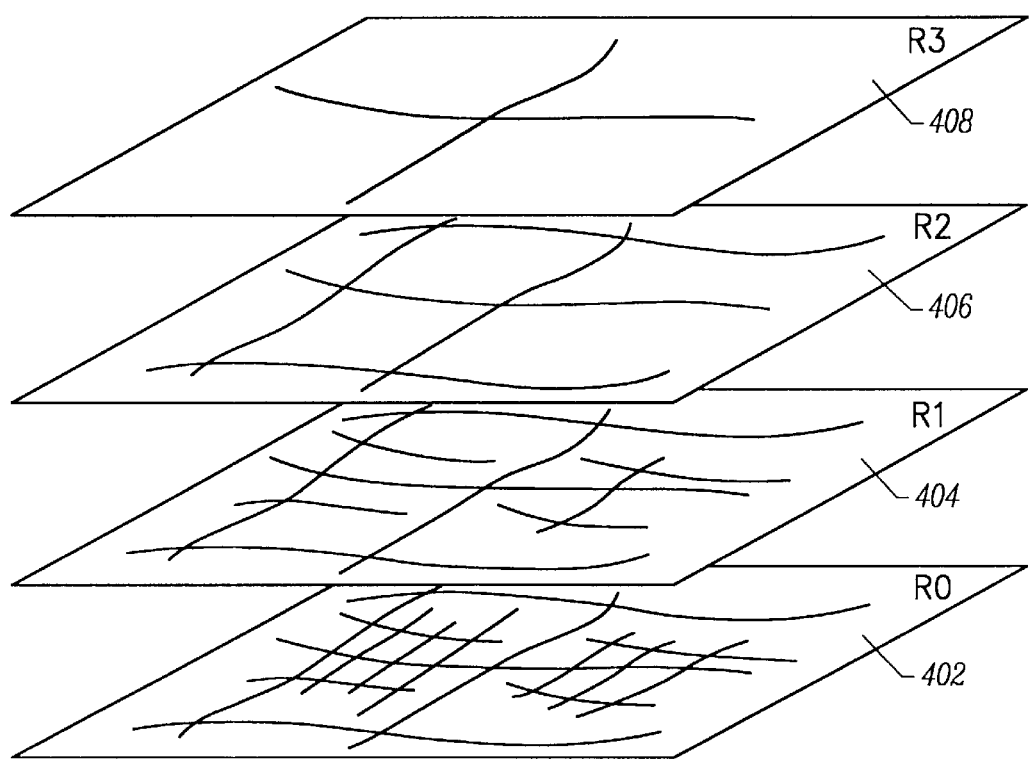
FIG. 4 is a diagram illustrating the concept of road segment rank suppression.

FIG. 4 provides a visual illustration of the effects of the successive suppression of road segments of ranks 0, 1 and 2 in ascending order. Layer 402 represents a portion of a the system's map database which includes road segments of ranks 0–3. Layer 404 represents the same portion of the map database in which road segments of rank 0 (i.e., residential/local roads) have been suppressed for searching algorithm purposes. That is, the route generation search algorithm ignores road segments of rank 0. Layer 406 represents the same portion of the map database after road segments of both rank 0 and rank 1 (i.e., surface arteries) have been suppressed. Finally, layer 408 represents the same portion of the map database after ranks 0, 1, and 2 have been suppressed. Rank 2 represents expressways. By successively ignoring various segment ranks, the search area remains the same, but the search time may be dramatically reduced.

Rank Suppression Limit

According to another embodiment, the suppression of lower rank segments is not done immediately upon encountering a higher rank segment because this may result in missing the optimal route. Instead, a suppression limit is set for each rank which allows the system to continue to search segments of the associated rank even after a segment of a higher rank is encountered. In one embodiment, the suppression limit for each rank corresponds to the number of segments (of any rank) which must be searched before the corresponding rank of road segments may be suppressed. Thus, for example, if the suppression limit for rank 0 segments is 100, the route generation algorithm ignores rank 0 segments if the route has expanded to meet a rank 1 segment and at least 100 road segments have subsequently been searched.

According to a more specific embodiment, the suppression limits for each rank are variable and are dependent upon the distance between the source and the destination. Thus, for example, as the distance between the source and the destination increases, the suppression limits decrease. This reflects the fact that when the source and destination are far apart, higher rank roads such as freeways are generally favored over lower rank roads such as local surface streets.

According to another specific embodiment, the suppression limits are variable and are dependent on the digitization density of the map region in which the search algorithm is operating. That is, for densely digitized regions in the map database, the suppression limits are increased. This reflects the fact that a greater number of segment expansions are typically required to reach a desirable higher rank road in such densely digitized regions.

Adjusting the Search Region in Grid-Pattern Regions

According to another specific embodiment, the route generation method of the present invention is further adapted to generate more efficient routes in grid-pattern regions, i.e., regions in which road segments are laid out in a substantially regular grid pattern, such as, for example, many urban and suburban areas. Recognition of such regions is described in commonly assigned, copending U.S. patent application Ser. No. 08/480,759, entitled RECOGNITION OF GEOGRAPHICAL REGION TYPES IN A MAP DATABASE, filed on Jun. 7, 1995, the entire specification of which is incorporated herein by reference.

Figure 5A:
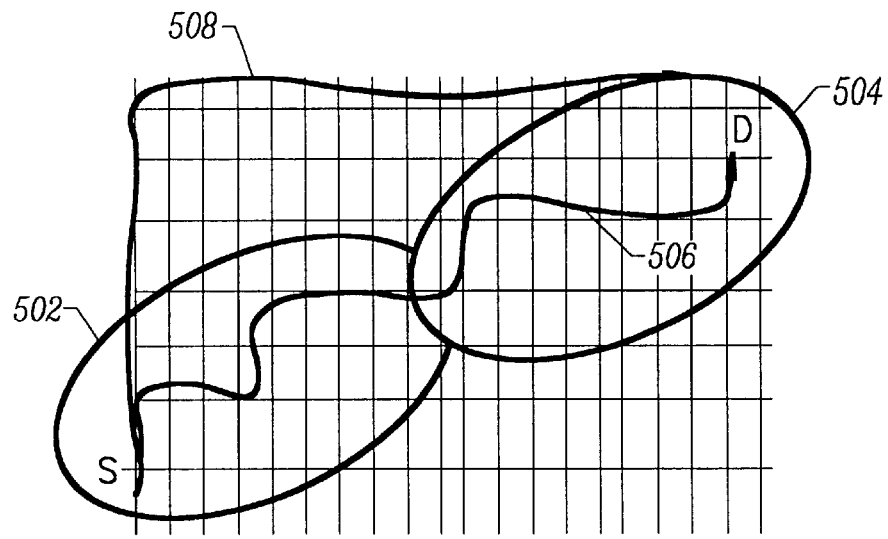
FIGS. 5A and 5B illustrate another problem with using the A* algorithm and one solution to that problem.
Figure 5B:
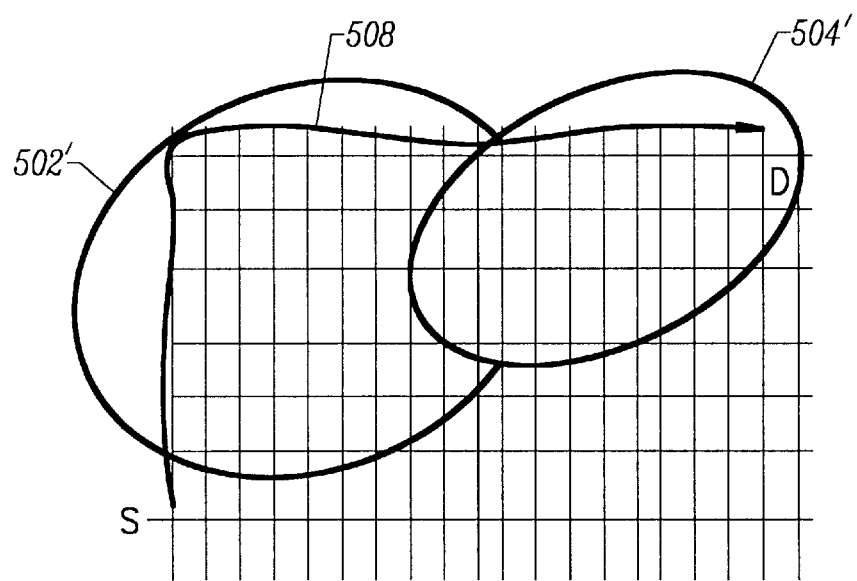

One of the problems associated with employing a two-ended search algorithm based on A* in a grid-pattern region is illustrated by FIG. 5A. As search regions 502 and 504 tend toward the opposite route end point, the generated route tends to lie within a narrow region around the diagonal between S and D. This results in a route 506 with several turns as opposed to a more desirable route 508 with only one turn. Therefore, according to the invention, once the vehicle navigation system has determined that it is currently operating in a grid-pattern region, the search regions are loosened as illustrated by search regions 502' and 504' of FIG. 5B. This has the effect of including routes with fewer turns within the search regions, including route 508. Then, when the route generation algorithm considers the costs associated with making turns, especially left turns, it becomes more likely that a route between S and D with fewer turns will be generated. According to a more specific embodiment, to increase the likelihood that a route with fewer turns will be generated, the cost for making turns in grid-pattern regions is increased.

Algorithm Flowchart

Figure 6A:
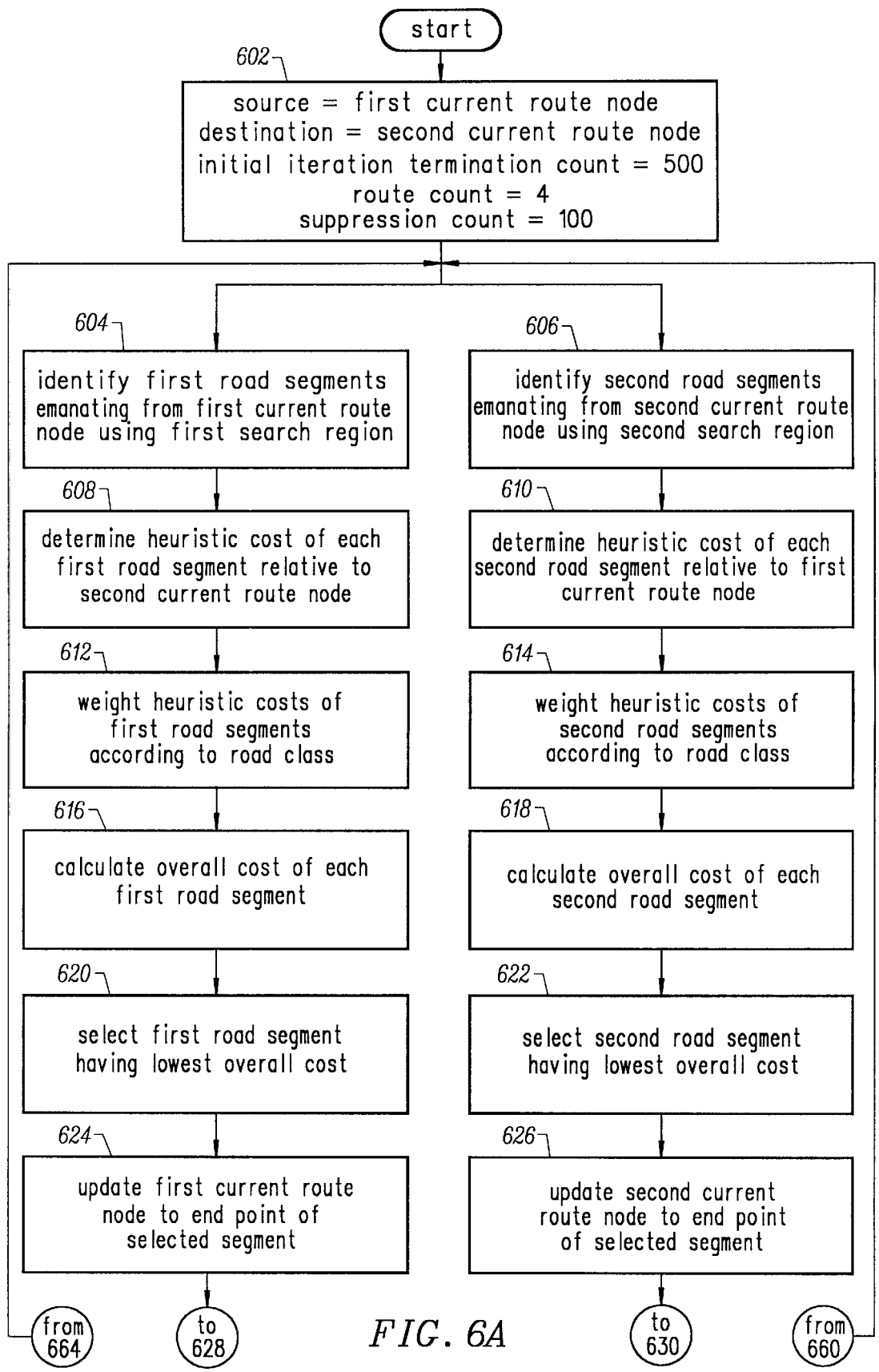
FIGS. 6A and 6B comprise a flowchart which illustrates the operation of a particular embodiment of the two-ended search algorithm of the present invention.
Figure 6B:
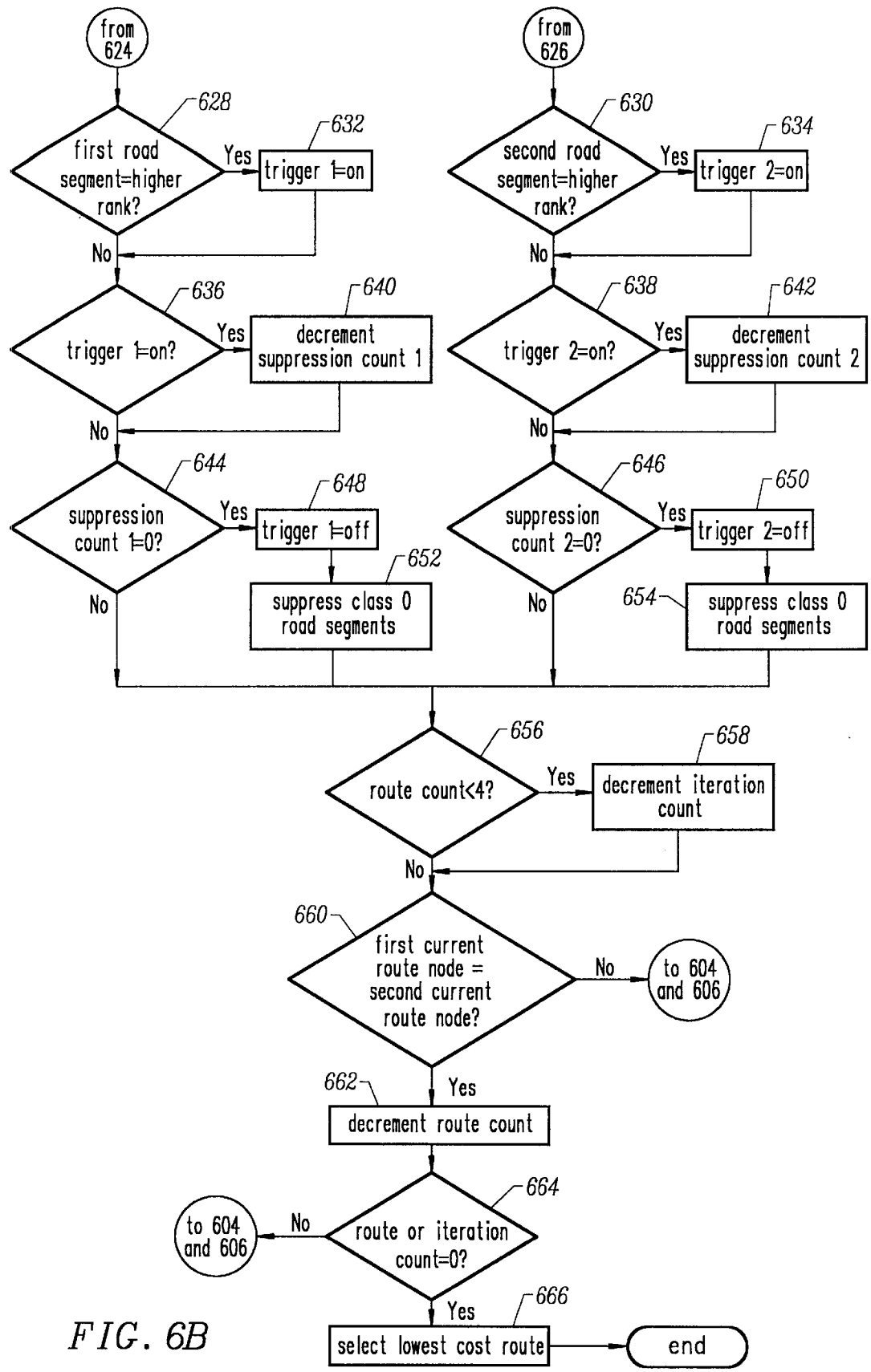

FIGS. 6A and 6B comprise a flowchart which illustrates the operation of a particular embodiment of the two-ended search algorithm of the present invention. The algorithm generates a route from a source location to a destination. Initially, the first and second current route nodes, i.e., the nodes in the forward and backward search path from which the algorithm is searching, are set to the source and destination, respectively, the iteration termination count is set to 500 and the route count is set to 4 (step 602). The route generation algorithm then performs two searches substantially in parallel, i.e., from the source toward the destination and vice versa. Road segments emanating from the current route nodes are identified (steps 604 and 606), and heuristic costs are determined for each relative to the current route node of the other search (steps 608 and 610). According to some embodiments, the heuristic costs are then weighted according to their respective road classes (steps 612 and 614), with the weights favoring higher class segments. The overall cost for each segment is then determined (steps 616 and 618) and the lowest cost segments for each of the searches are selected as the next segments in the respective routes (steps 620 and 622). The current route nodes are then updated to the end points of the selected segments (steps 624 and 626).

FIGS. 6A and 6B illustrates an embodiment in which class 0 road segments are suppressed, i.e., ignored in subsequent searching, in each of the searches after 100 iterations of the two-ended search algorithm, and after class 1 road segments have already been encountered by each search (steps 628–654). It should be noted, however, that a wide range of variations may be employed in place of these steps without departing from the scope of the invention. For example, class 0 segments may be suppressed after fewer iterations, or alternatively, immediately after the first encounter of a class 1 segment. Moreover, higher level segments may be similarly suppressed after some number of iterations and upon encountering a still higher level segment, e.g., class 2.

The system then determines whether any routes from the source to the destination have been generated by referring to the route count. If the route count is less than its initial value (step 656), in this example, four, the iteration termination count is decremented (step 658). The system then determines whether the current route nodes for each end of the two-ended search coincide (step 660). If not, the algorithm performs another iteration beginning with steps 604 and 606. If the current route nodes coincide, i.e., a complete route has been generated, the route count is decremented (step 662). The system then determines whether the iteration termination count has reached zero (step 664). If not, the algorithm performs another iteration beginning with steps 604 and 606. If the iteration termination count has timed out, the system selects the lowest cost route from among all of the possible routes generated so far (step 666).

Incremental Route Generation

It becomes apparent that for particularly densely digitized map databases, the above-described route generation procedure becomes a highly complicated and time consuming determination which results in delays in the communication of route instructions and upcoming maneuvers to the user. As discussed earlier, the present invention avoids these delays by selecting an intermediate destination close to the initial source location, generating a route to the intermediate location, and communicating the intermediate route while continuing to determine the route to the final destination. But how does the system know when to use this feature? In one embodiment, the feature may be selected based on parameters such as the known relationship between the initial source location and the final destination and their geographical surroundings, e.g., both locations are in densely digitized urban areas separated by a sparsely digitized rural or highway area. In another embodiment, intermediate destinations are always determined, but a best intermediate destination is not chosen and the intermediate route is not communicated to the user unless the determination of the entire route takes longer than a programmable timeout period. This embodiment will be discussed in greater detail below. The method by which the present invention selects an intermediate destination is described with reference to FIG. 7.

Figure 7:
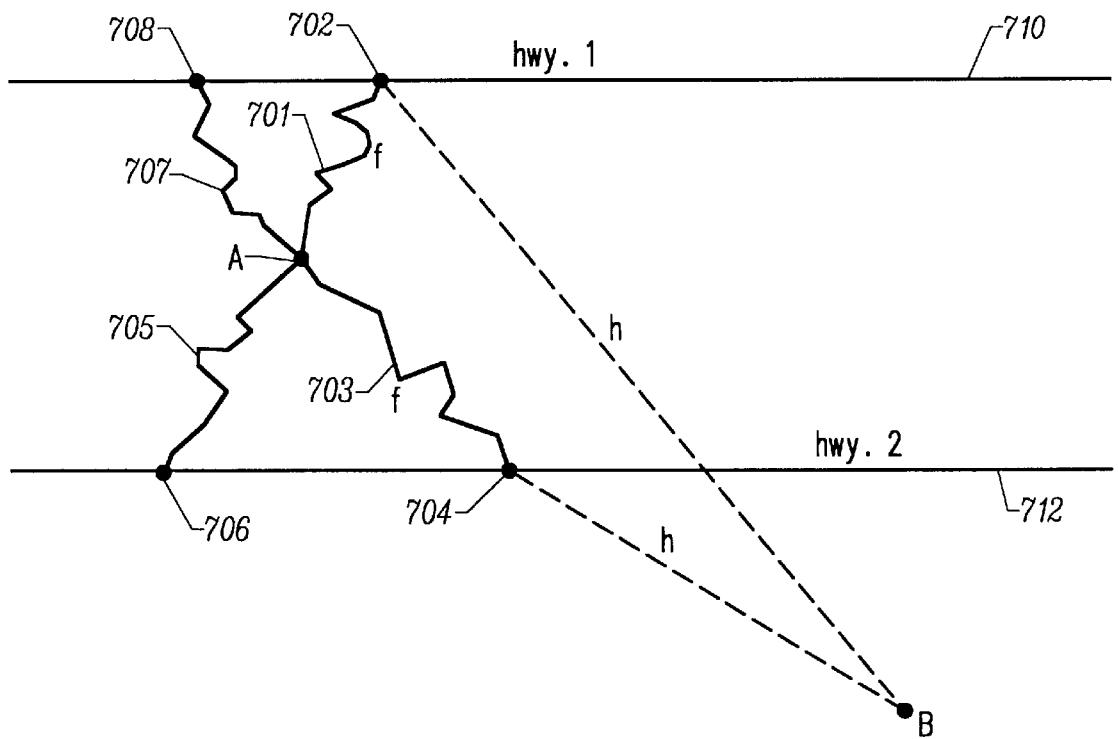
FIG. 7 illustrates the intermediate destination selection methodology according to a specific embodiment of the invention.

FIG. 7 shows a source location at point A and a final destination at point B. Point A generally represents the stationary starting position of the vehicle. However, if route generation is performed while the vehicle is moving, point A may be chosen at a position ahead of the current vehicle position. Parameters such as the vehicle's direction and speed may be taken into account for the determination of the source location in such a situation. Four possible intermediate routes 701, 703, 705, and 707 are shown from point A to four different intermediate destinations 702, 704, 706, and 708, respectively. The intermediate destinations in this example are access points to highways 710 and 712. Highway access points are often chosen as intermediate destinations because they are easily identifiable, and the forward route generation from the highway access point becomes simplified for the reasons discussed above. Essentially, the intersection with any road which is of a higher category than the road of the source location may be selected as a possible intermediate destination.

Referring again to FIG. 7, the navigation system explores several possible paths in the map database emanating from point A during a timeout interval, after the expiration of which, the best candidate for the intermediate destination is chosen. The timeout interval may be a multilevel interval. That is, the interval may be programmed to expire after 10 seconds if 3 or more candidates are found, and after 20 seconds if only one or two are found. The figure shows a situation in which four candidates for an intermediate destination have been found, i.e., highway access points 702, 704, 706, and 708. Once the candidates are selected, the system calculates an overall cost f(dest) for each possible intermediate destination by combining all of the segment and node costs, i.e., g(n) and g(k), for the route leading to that destination with the heuristic cost associated with that destination, i.e., h(dest). In a specific embodiment, the relationship appears as follows:

$$f(dest) = \left[\sum_{route} g(n) + g(k)\right] + h(dest) \quad (1)$$

It will be understood that there are a number of different ways in which these values could be combined, or in which cost values may be assigned to derive an overall cost value for each intermediate route. The present invention is not limited to the specific embodiment described.

Another method for selecting an intermediate destination is provided by the present invention. According to this embodiment, the user is presented with a list of highways and highway access points within 10 miles of the source location. The user may then select the desired highway and/or specific access point. This feature may be useful where, for example, the user knows that she needs to access a certain highway but requires route generation to get to that highway from her current location.

Once the intermediate destination has been selected and the intermediate route generated, the appropriate series of maneuvers are communicated to the user via the system display. These generally comprise a series of screens, each of which communicates information regarding the next maneuver to be performed by the user like, for example, the distance to the next maneuver, or the nature of the next maneuver (e.g., left turn). While the system is providing the user with this information, the remainder of the route to the final destination and the corresponding maneuvers are determined using the intermediate destination as the starting point. In this way, navigation is allowed to begin before the entire route is determined, thereby allowing the user to begin driving almost immediately. Maneuver generation and route guidance will be discussed in more detail below.

As briefly mentioned above, according to a specific embodiment of the invention, the vehicle navigation system may be programmed to wait until the expiration of a timeout period before selecting an intermediate destination. If the entire route to the final destination is determined within the timeout period, then the communication of an intermediate route is considered unnecessary and the intermediate destination is not selected. If, however, the entire route to the final destination is not complete before the expiration of the timeout interval, the system selects an intermediate destination and operates as described above. If the entire route is still not complete before the expiration of another timeout interval, the system may be programmed to determine another intermediate destination beyond the first intermediate destination. The selection of the next intermediate destination proceeds similarly to the selection of the first as described above. This process may be repeated until the remainder of the entire route has been determined. Alternatively, the system may be programmed to begin determining the next intermediate destination immediately if it is determined that the generation of the route to the final destination is not yet complete. As with the first intermediate destination, the system may be programmed so that each successive intermediate route is fully determined and the corresponding maneuvers communicated to the user only when the determination of the remainder of the entire route is not yet complete or requires more than a programmable timeout interval.

Figure 8:
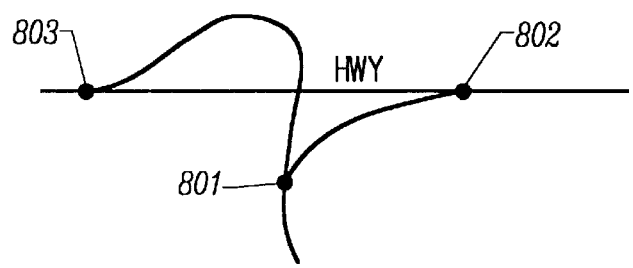
FIG. 8 illustrates the selection of an intermediate destination which allows further travel in either highway direction.

What if the intermediate location is so close that the vehicle arrives at the intermediate destination before the entire route determination is complete? If the intermediate location is a highway access point, the maneuver onto the highway can be communicated to the user with a follow up instruction such as, for example, "Stay on the highway— Generating the rest of the route". How then does the system know which direction of travel on the highway to communicate? Different embodiments of the present invention deal with this situation in the following ways. According to one embodiment, the direction of travel is deduced based on the direction from the highway access point to the final destination. According to another embodiment, a first intermediate destination 801 is chosen before either of the access points 802 or 803 as shown in FIG. 8 so that either highway direction may be selected. In the mean time, another intermediate destination beyond the first intermediate destination, the route to which will be known by the time the first intermediate destination is reached.

Another solution to the problem of arriving at the first intermediate destination relates to the determination of further intermediate destinations. In this embodiment of the invention, if the entire route is still not complete by the time the vehicle arrives at the intermediate destination, the system may be programmed to determine another intermediate destination beyond the first intermediate destination. The selection of the next intermediate destination proceeds similarly to the selection of the first as described above. This process may be repeated until the remainder of the entire route has been determined. In a more specific embodiment, each intermediate route is fully determined and the corresponding maneuvers communicated to the user only when the determination of the remainder of the entire route requires more than a programmable timeout interval.

Figure 9:
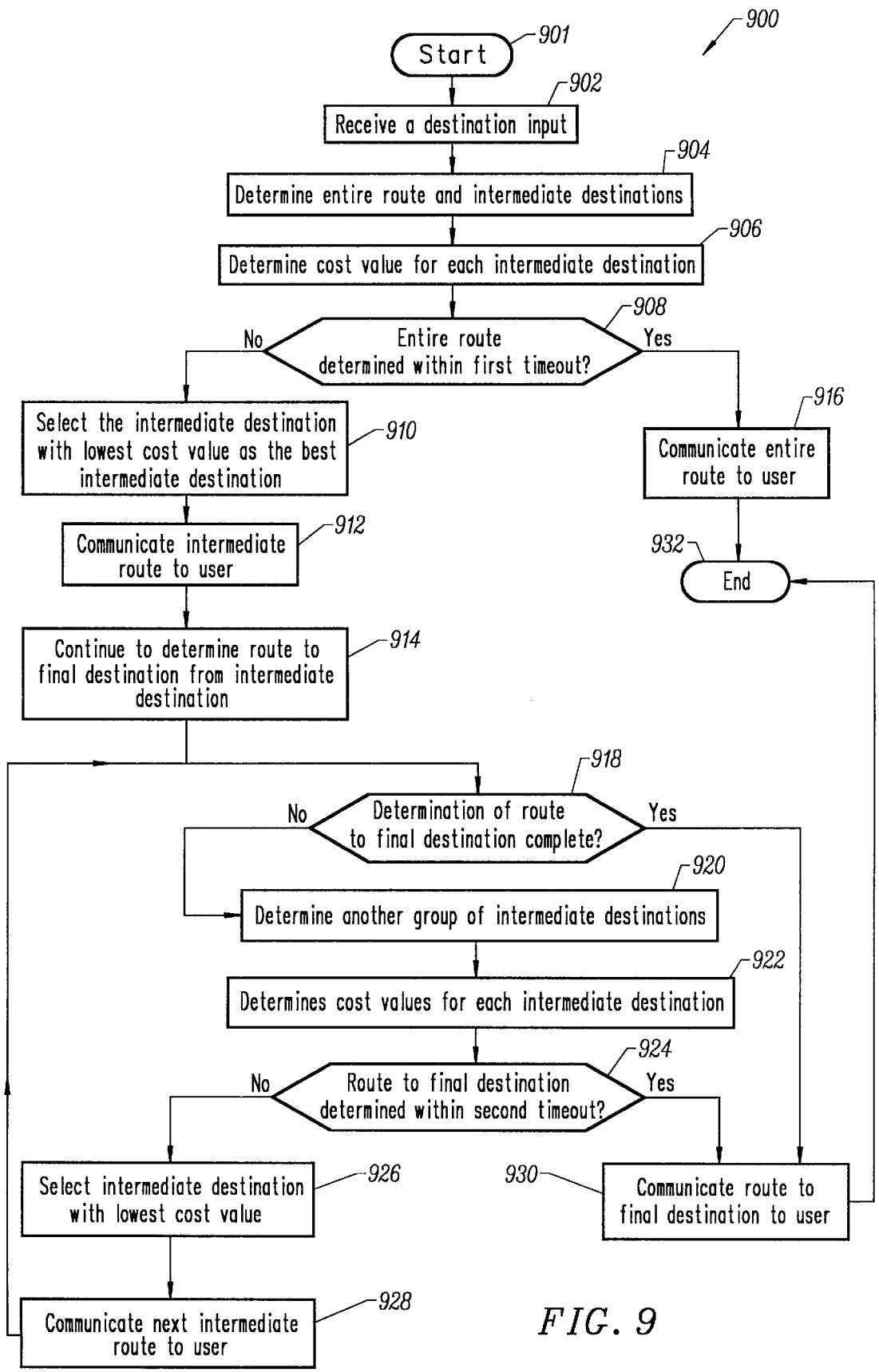
FIG. 9 is a flowchart describing the operation of a specific embodiment of the invention.

FIG. 9 is a flowchart 900 which describes the operation of a specific embodiment of the invention. Initially, the system receives a destination input by a user for the purpose of generating a route to the destination (step 902). The system then begins to determine the route from the vehicle's current position to the desired destination while simultaneously determining at least one intermediate destination (step 904). The system then determines a cost value for each intermediate destination (step 906). If a programmable time interval passes and the determination of the entire route from the initial position to the final destination is not complete (step 908), the system selects the intermediate destination having the lowest cost value as the best intermediate destination (step 910) and communicates the intermediate route to the user (step 912). The system then continues to determine a route to the final destination from the intermediate destination (step 914). If, on the other hand, the determination of the entire route is complete, the entire route is communicated to the user (step 916).

If the determination of the route to the final destination is not yet complete (step 918), the system determines another group of intermediate destinations between the first intermediate destination and the final destination (step 920) and determines a cost values for each (step 922). If the route generation is not complete after a second programmable time interval (step 924), the system again selects the intermediate destination with the lowest cost value (step 926) and communicates the next intermediate route to the user (step 928). Steps 918–928 may be repeated until the remainder route to the final destination has been determined, at which point it is communicated to the user (step 930).

Figure 10:
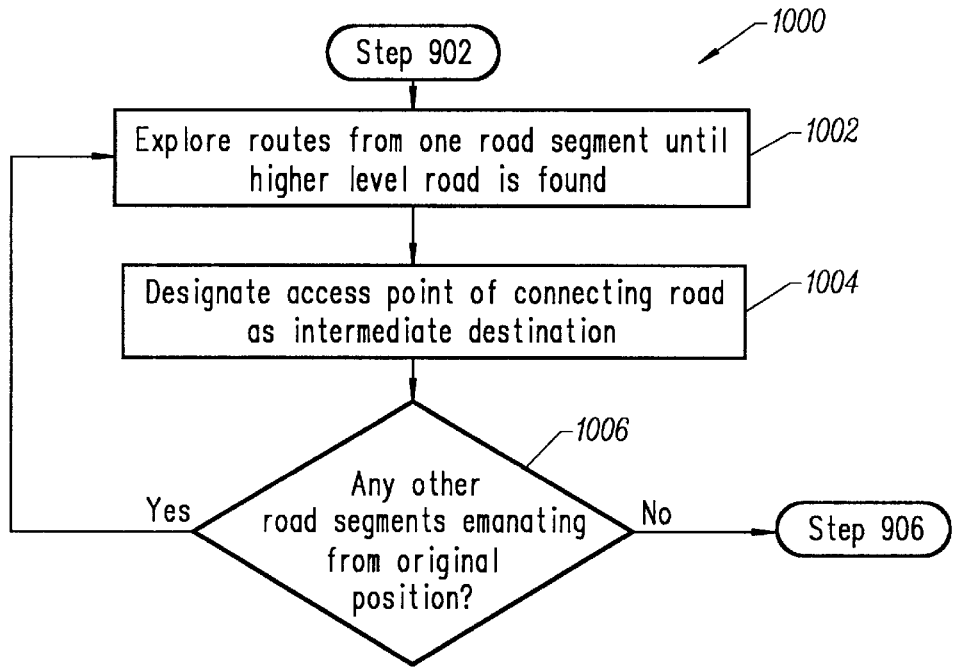
FIG. 10 is a flowchart describing the selection of a plurality of intermediate routes according to a specific embodiment of the invention.

FIG. 10 is a flowchart 1000 describing the selection of a plurality of intermediate routes according to a specific embodiment of the invention. The system explores possible routes emanating from one of the road segments directly connected to the vehicle's original position until a connecting road is encountered having a hierarchy level greater than the hierarchy level of the original position's road (step 1002). The system then designates the access point to the connecting road as one of the intermediate destinations (step 1004). Steps 1002 and 1004 are then repeated for each of the road segments emanating from the original position (step 1006).

Figure 11:
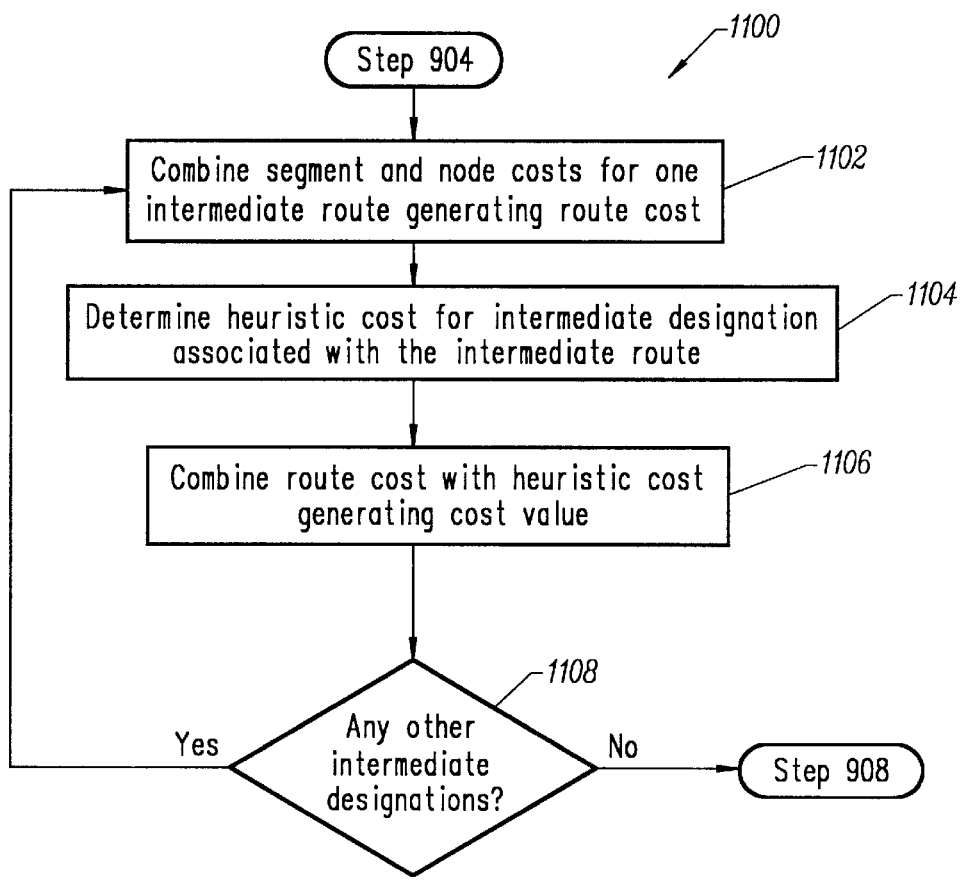
FIG. 11 is a flowchart describing the determination of cost values for a plurality of intermediate destinations according to a specific embodiment of the invention.

FIG. 11 is a flowchart 1100 describing the determination of cost values for a plurality of intermediate destinations according to a specific embodiment of the invention. The system combines the segment and node costs for the road segments and nodes in one of the intermediate routes emanating from the vehicle's initial position, thereby generating a route cost for that intermediate route (step 1102). The system then determines a heuristic cost for the intermediate destination associated with the intermediate route (step 1104). The heuristic cost corresponds to the distance between the intermediate destination and the final destination. The system then combines the route cost with the heuristic cost and generates a cost value for the intermediate destination (step 1106). Steps 1102–1106 are then repeated for each of the intermediate destinations (step 1108).

Partial Route Seaming

Figure 12A:
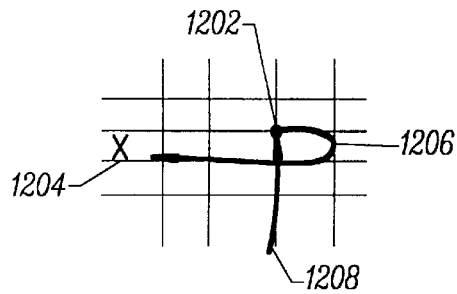
FIGS. 12A–D are a series of diagram illustrating different route seaming scenarios.
Figure 12B:
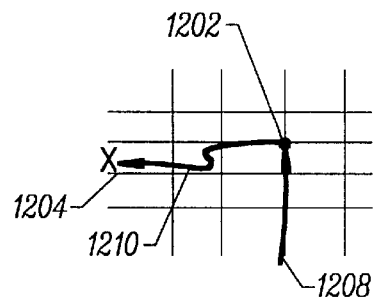
Figure 12C:
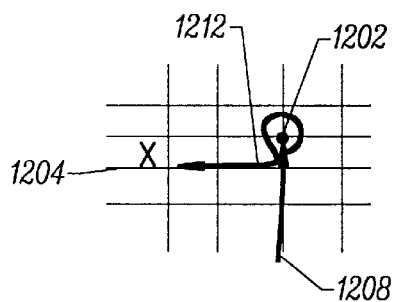
Figure 12D:
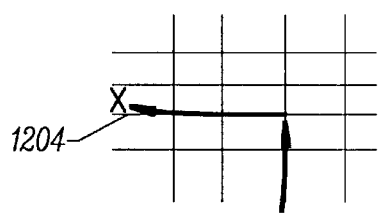

When, as discussed above, a partial route is generated to some intermediate destination, and then another partial route is generated from the intermediate destination to either another intermediate destination or the final destination, the problem of "seaming" the routes together in an efficient way arises. FIGS. 12A–C illustrate some of the typical detours encountered when seaming two partial routes together. In each case, the first partial route ends at node 1202 which is beyond street 1204 upon which the second route eventually proceeds to the destination X. To get from node 1202 to street 1204, the second route must "backtrack" to some extent resulting in an inefficiency which, from the user's perspective, may end up being rather inconvenient. In FIG. 12A, for example, second route 1206 loops back over first route 1208 requiring the user to make three turns where only one should be required. That is, in the real world, the user would most likely prefer to execute the maneuver illustrated in FIG. 12D, i.e., simply turn left onto street 1204 without first proceeding to node 1202. In FIG. 12B, second route 1210 instead turns left but still requires two additional turns to get onto street 1204. Second route 1212 of FIG. 12C requires only two turns to get onto street 1204. However, one of these is a U-turn which, in some circumstances, may be extremely difficult or time consuming.

Figure 13:
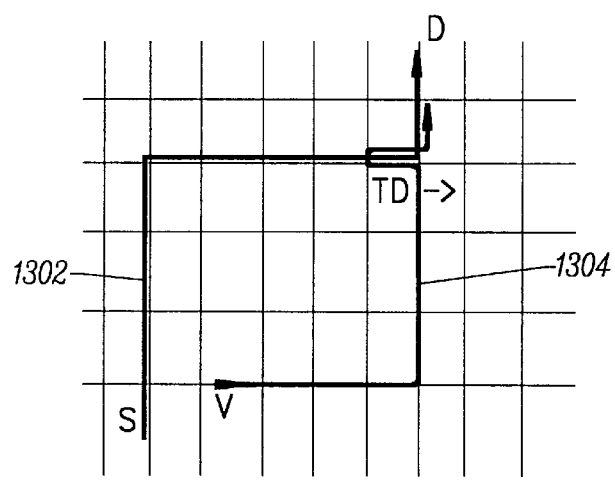
FIG. 13 is a diagram illustrating another route seaming scenario.

A similar problem arises when the user departs from a generated route and must regenerate from some point back to the generated route. In FIG. 13, an original route 1302 from S to D had been generated but the user departed from route 1302 and initiated a regeneration from location V. The regenerated partial route 1304 met with route 1302 at segment TD. However, the direction of travel on TD in partial route 1304 was opposite that of route 1302, necessitating some sort of detour to get back on route 1302 toward D. Because such inconveniences will generally not be tolerated by users, specific embodiments of the present invention provide methods for seaming partial routes together which avoid these inefficient detours.

Figure 14:
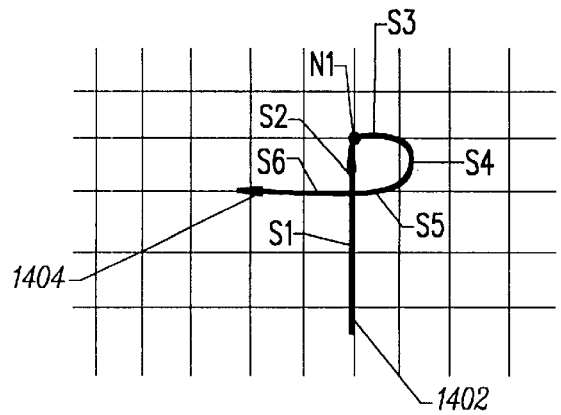
FIG. 14 is a diagram illustrating a method for optimizing the connection between two routes.
Figure 15:
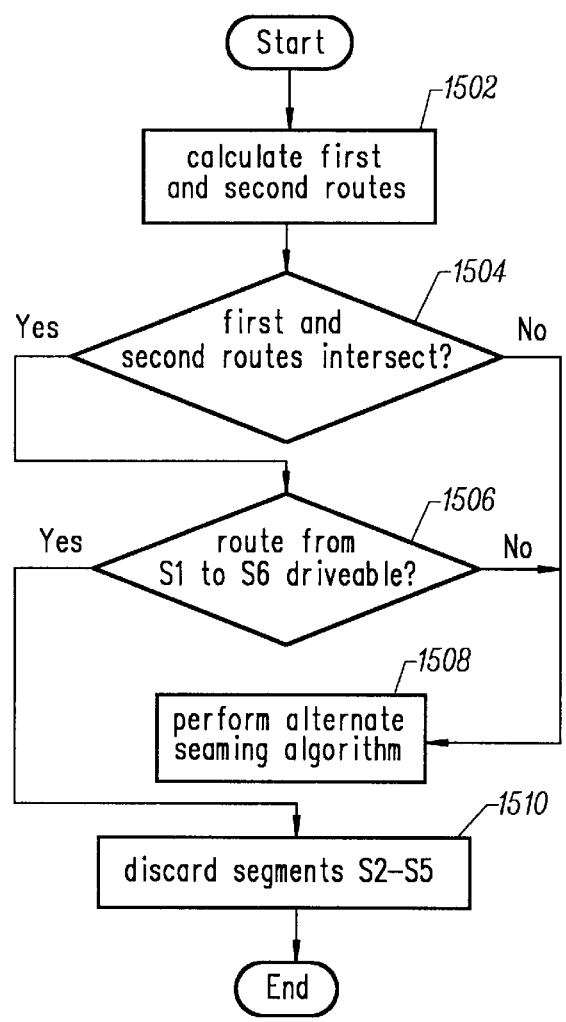
FIG. 15 is a flowchart illustrating a method for optimizing the connection between two routes.

According to one embodiment, where the second generated route crosses over or intersects with the first generated route (as in FIGS. 12A and 12C), any unnecessary road segments connected to the point of intersection are discarded. This may be understood with reference to the diagram of FIG. 14 and the flowchart of FIG. 15. Initially, first and second routes are generated (step 1502). In this example, first generated route 1402 ends just beyond node N1 with segment S2, and second generated route 1404 begins where route 1402 ends and proceeds with segments S3–S6 requiring a loop-back maneuver similar to the detour described with reference to FIG. 12A. If the system determines that the first and second generated routes intersect (step 1504), it determines whether the route directly from S1 to S6 is driveable (step 1506). If the route do not intersect, or if the route from S1 to S6 is not navigable, an alternate seaming algorithm is performed (step 1508). If the routes intersect and S1–S6 is driveable, the system discards segments S2–S5 (step 1510). It will be understood that the u-turn scenario of FIG. 12C may also be used to illustrate this embodiment of the invention.

Figure 16:
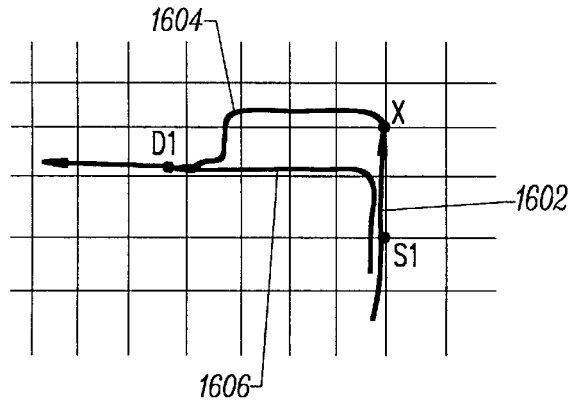
FIG. 16 is a diagram illustrating another method for optimizing the connection between two routes.
Figure 17:
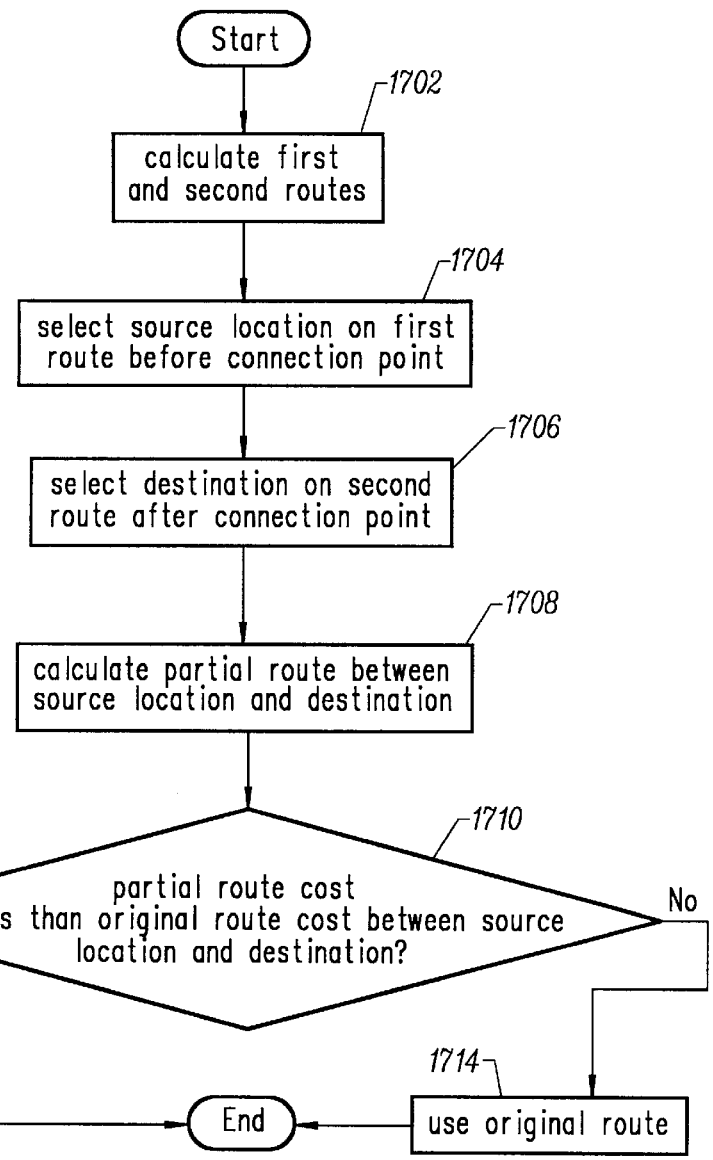
FIG. 17 is a flowchart illustrating another method for optimizing the connection between two routes.

According to another embodiment, another partial route is generated beginning from just before the end of a first generated route and ending a little after the beginning of the second generated route. The partial route is then used if its associated cost is lower than the originally generated route. This may be understood with reference to the diagram of FIG. 16 and the flowchart of FIG. 17. Initially, first and second routes 1602 and 1604 are generated (step 1702). In this example, first generated route 1602 ends and second generated route 1604 begins at connection point X. This results in a detour similar to that described with reference to FIG. 12B. The system selects a source location S1 along first route 1602 preceding connection point X (step 1704). The system then selects a destination D1 along second route 1604 a short distance after connection point X (step 1706) and generates a partial route 1606 between source S1 and destination D1 (step 1708). If the cost associated with partial route 1606 is less than the cost associated with the portions of the first and second routes between source S1 and destination D1 (step 1710), partial route 1606 replaces those portions of the first and second route (step 1712). Otherwise, the original route is retained (step 1714).

It will be understood that the end points of partial route 1606, i.e., source S1 and destination D1, represent new seaming points at which partial route 1606 is seamed with first and second routes 1602 and 1604, and that the above-described procedure may be employed in an iterative manner to optimize the overall route at each successive set of seaming points.

Termination of Partial Route Generation

Figure 18A:
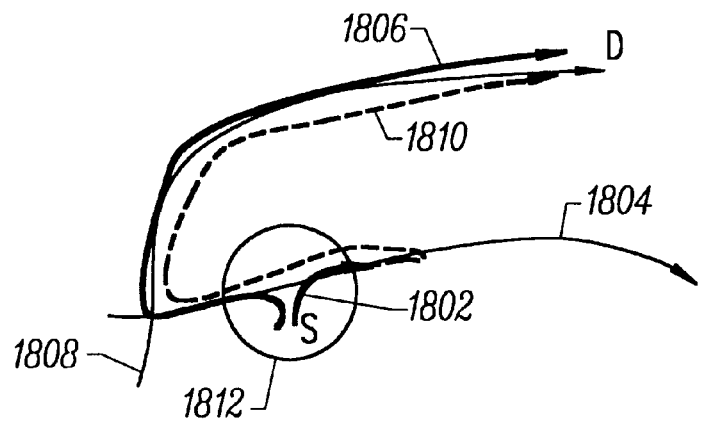
FIGS. 18A–C illustrate the termination of partial route generation according to a specific embodiment of the invention.

At what point should the generation of a partial route be terminated? FIG. 18A shows a situation in which a first partial route 1802 has been generated from S onto freeway 1804 eastbound. The eastbound direction was chosen because it is in the direction of the destination D. However, because freeway 1804 eventually turns toward the south, it turns out that the optimal route 1806 initially takes freeway 1804 westbound and then freeway 1808 north. As a result, if first partial route 1802 is used, the driver must eventually exit eastbound freeway 1804 and reenter in the westbound direction to follow second partial route 1810 to D.

Figure 18B:
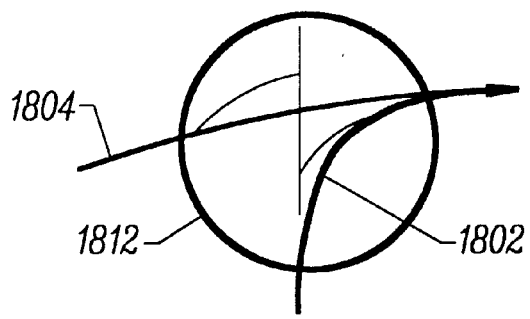
Figure 18C:
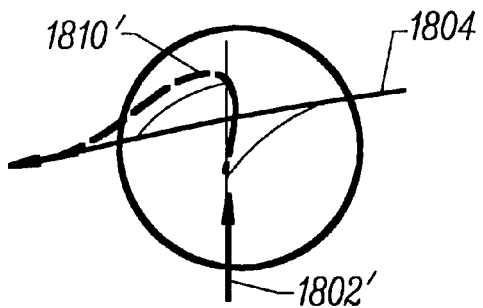

The above-described situation may be avoided according to a particular embodiment of the invention by truncating first partial route 1802 as illustrated in FIGS. 18B and 18C. FIG. 18B is a magnified view of area 1812 of FIG. 18A which shows first partial route 1802 and the east and westbound entrances to freeway 1804. FIG. 18C is a view of the same area with a truncated first partial route 1802' which allows the second partial route 1810' to enter freeway 1804 using the westbound entrance. Generally, upon reaching a freeway during generation of a partial route, this embodiment of the present invention terminates partial route generation and backs up along the partial route until it reaches a road segment which precedes the point at which a decision must be made whether to proceed in one direction or the other. This prevents the situation shown in FIG. 18A where the user proceeds in the wrong direction.

Figure 19A:
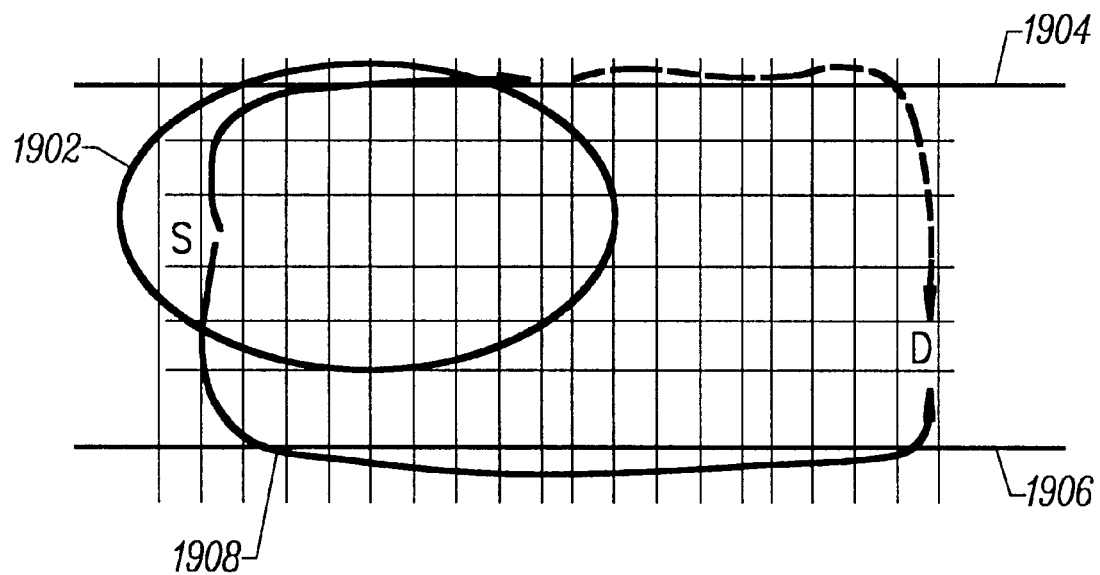
FIGS. 19A and 19B illustrate the termination of partial route generation according to another specific embodiment of the invention.
Figure 19B:
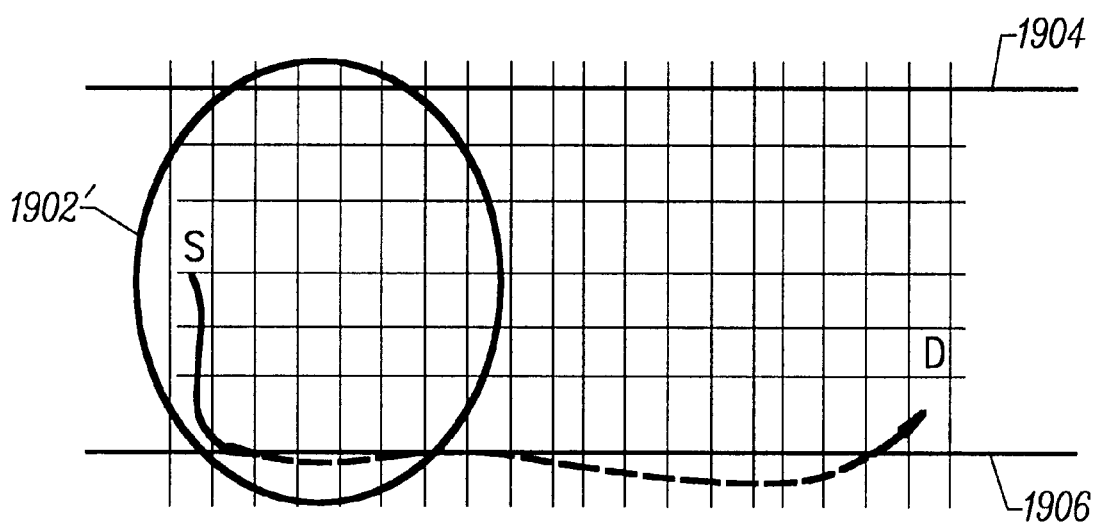

Another situation related to the termination of partial route generation is illustrated in FIGS. 19A and 19B. As shown by search region 1902 in FIG. 19A, when the A* search algorithm encounters a freeway 1904, it tends to expand search region 1902 in the direction of destination D along freeway 1904, resulting in a situation in which the use of freeway 1906 may be overlooked despite the fact that it lies on optimal route 1908. To avoid this result, the present invention stops expanding a partial route which reaches a freeway but continues to look for alternate routes. This results in the expansion of a search region as illustrated by region 1902' of FIG. 19B. Because expansion along freeway 1904 is suspended, search region 1902' eventually reaches freeway 1906 by which a more efficient route is realized.

According to another embodiment of the invention, each of the possible partial routes being explored by the route generation algorithm is expanded to a point where the combined g costs (representative of driving time) of the segments in at least one of the possible partial routes reaches a threshold value. The system then selects the partial route having the lowest h cost, i.e., the one with an endpoint closest to the destination. In a specific embodiment, the system waits until each possible partial route is expanded to reach the g cost threshold before making the selection. In this embodiment, because the g cost for each route is the same, either the h cost or the f cost (f=g+h) may be employed to determine which is the best partial route.

In more specific alternate embodiments, the g cost threshold value is either fixed or variable. Where the g cost threshold is variable its value relates to the distance between the source and the destination. That is, the greater the distance between the source and the destination, the higher the g cost threshold will be set. This ensures that the driving time (i.e., g cost) associated with the generated partial route is sufficiently long for the complete route to the destination to be generated before the vehicle reaches the end of the partial route. The variable g cost threshold also ensures that the length of the selected partial route will not be overly long with respect to the complete route. Where the source and destination are relatively close, the longer the partial route is with respect to the complete route, the greater the chance that the optimal route is not being generated. This often results in undesirable backtracking maneuvers, such as u-turns or exiting and reentering freeways, being included in the complete route. Maintaining the partial route in proper proportion to the complete route reduces the risk of such undesirable occurrences.

Figure 20:
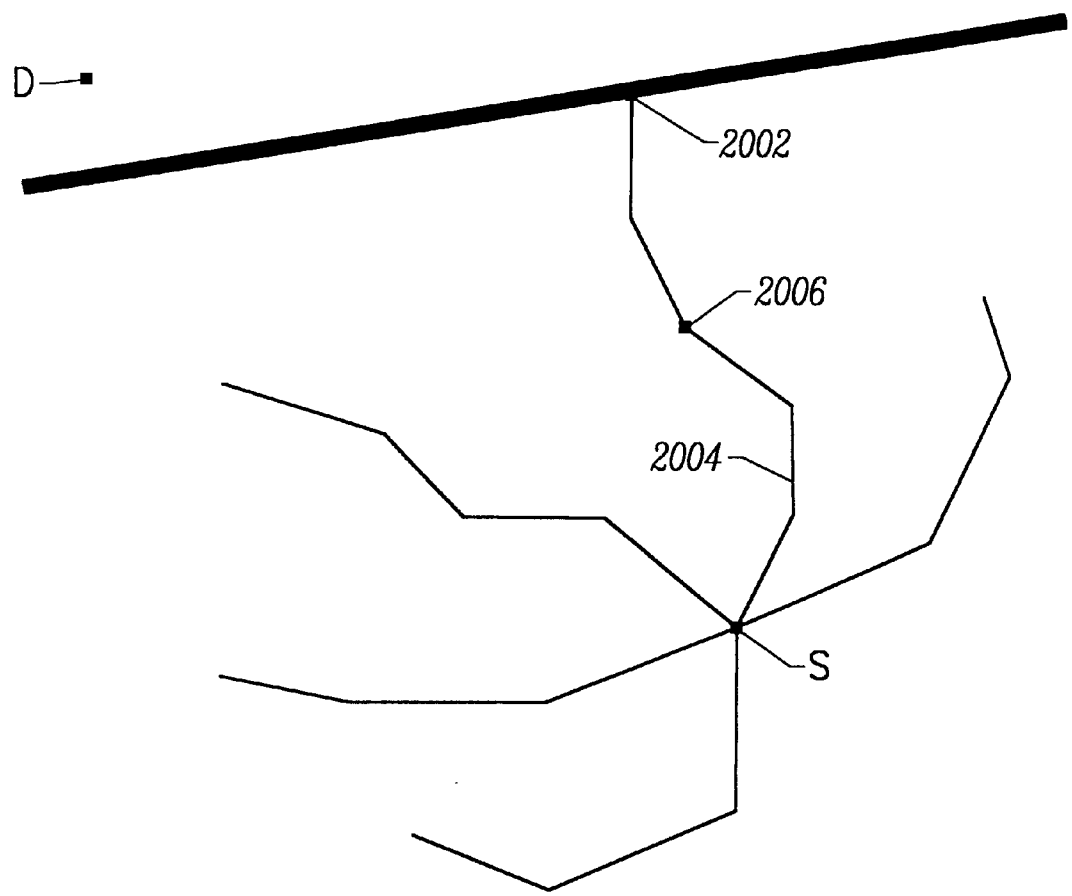
FIG. 20 is a diagram illustrating termination of partial route generation according to yet another embodiment of the invention.

According to an alternate embodiment, the g cost threshold is set high enough to ensure that at least one of the partial route candidates includes the nearest highway entrance. It will be understood, however, that this goal may, in some instances, conflict with the goal of maintaining the length of the partial route in proper proportion to the distance between the source and the destination. Therefore, a particular embodiment of the invention resolves this conflict in the following manner as described with reference to FIG. 20. Initially, the g cost threshold is set such that the closest highway entrance (at node 2002) is included in at least one partial route candidate. The search algorithm then expands the various partial routes until the highway entrance is reached. If the g cost of the partial route including the highway entrance (i.e., route 2004) does not exceed the g cost threshold which is related to the distance between source S and destination D, there is no conflict. However, when it does exceed this distance-based threshold, the system backs up the end point of the partial route to a point 2006 where its g cost does not exceed the distance-based threshold. This makes it more likely that the complete route will be closer to the optimal route and less likely that the driver will do something like enter the highway going the wrong direction.

According to a particular embodiment of the vehicle navigation described herein, the user is allowed to specify certain parameters which affect the operation of the route generation algorithm. For example, according to one embodiment, the user is allowed to specify a preference regarding the use of freeways. That is, the user may specify that the algorithm make the most or the least use of freeways in generating the route. The algorithm accommodates the user's preference by manipulating the g costs associated with the freeway segments. So, for example, if the user specifies that the algorithm make the least use of freeways, the g costs associated with freeway segments are increased to make them less desirable candidates for inclusion in the generated route. Thus, the g costs employed by the route generation algorithm are not always the actual g costs for the corresponding road segments. Therefore, when determining whether a partial route candidate has reached the g cost threshold, the system keeps track of the actual g costs of the segments in the partial route candidate in parallel with the manipulation of the g costs for implementing options such as the most/least use of freeways option.

Maneuver Generation and Route Guidance

FIGS. 21A–D are a series of time lines which illustrate the manner in which maneuver instructions associated with generated routes may be generated and communicated to a driver. According to a first embodiment of the invention (FIG. 21A), the entire route is generated (as represented by R), followed by generation of the maneuver instructions corresponding to the generated route (as represented by M). Only when all of the maneuver instructions are generated does the system begin to communicate them to the driver (as represented by G for "guidance").

However, as discussed above with reference to incremental route generation, the time required for generation of the entire route may be significant resulting in an undesirable delay before the driver begins receiving maneuver instructions and can leave the source location. Therefore, according to a second embodiment of the invention (FIG. 21B), the point at which route guidance begins may be advanced significantly. The system generates the entire route (R), followed by generation of the first several maneuver instructions (as represented by M1), followed by generation of the remainder of the maneuver instructions (as represented by M2). Route guidance (G) may thus begin after the first several instructions have been generated; well in advance of the point at which all of the instructions have been generated. In many route generation scenarios, this represents a substantial improvement. Unfortunately, the undesirable delay represented by the route generation remains.

Figure 21A:
FIGS. 21A–D are a series of time lines which illustrate the manner in which maneuver instructions associated with generated routes may be generated and communicated to a driver.
Figure 21B:
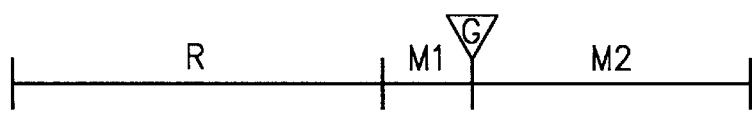
Figure 21C:

In view of this result, a third embodiment of the invention combines incremental maneuver generation with incremental route generation as described above. FIG. 21C shows a time line in which the route generation is divided into two partial route generations (as represented by R1 and R2). The maneuvers corresponding to the first partial route are generated immediately after the first partial route is generated (as represented by M1) and route guidance begins immediately thereafter. Finally, the maneuvers corresponding to the remainder of the route are generated (as represented by M2) after the second partial route has been generated. As revealed by a comparison of the time lines of FIGS. 21B and 21C, a significant improvement is realized with this embodiment.

A further reduction in the delay before route guidance may begin is realized by combining the techniques described above with reference to FIGS. 21B and 21C. According to this embodiment (FIG. 21D), route generation is again divided into two partial route generations (R1 and R2). However, instead of waiting until all of the maneuver instructions corresponding to the first partial route are generated before beginning route guidance, only a portion of these are generated (as represented by M1) at which time route guidance begins (G). The remainder of the maneuver instructions is then generated (M2) followed by the second partial route generation (R2) and the generation of the remainder of the maneuver instructions which correspond to the second partial route (M2). Again, comparison of the time lines of FIGS. 21C and 21D reveal that another improvement is realized.

Figure 21D:
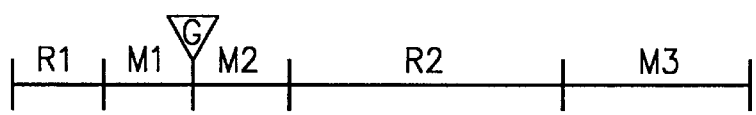

The number of "incremental" maneuver instructions generated may vary according to the different embodiments described above. "Incremental" maneuver instructions refers to the maneuver instructions after generation of which route guidance begins. For example, in the embodiment of FIG. 21B, enough "incremental" maneuver instructions are generated (M1) to allow the remainder of the maneuver instructions to be generated (M2) before the driver actually executes all of the first set of maneuvers. Such a number may be established, for example, with reference to the distance between the source and destination. Alternatively, the number of "incremental" maneuver instructions may be determined by relating the g cost corresponding to the part of the route encompassed by the "incremental" maneuver instructions to the time required to generate the remainder of the instructions. In the embodiment of FIG. 21C, the number of "incremental" maneuver instructions generated (M1) directly relates to the number of maneuvers in the first partial route. In the embodiment of FIG. 21D, the number of "incremental" maneuver instructions generated (M1) may relate to the time required for generation of the remainder of the instructions corresponding to the first partial route (M2). That is, the g cost associated with the portion of the first partial route corresponding to the "incremental" maneuver instructions should be such that the remainder of the instructions corresponding to the first partial route may be generated before the driver executes all of the "incremental" maneuvers.

Conclusion

Figure 22A:
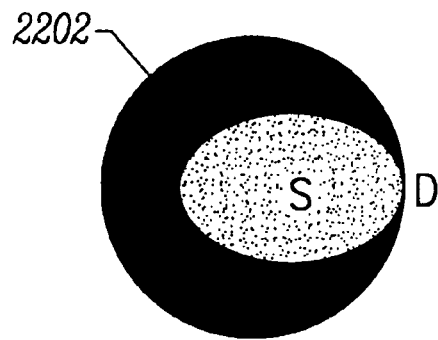
FIGS. 22A–D are representations of search regions for various route generation algorithms.
Figure 22B:
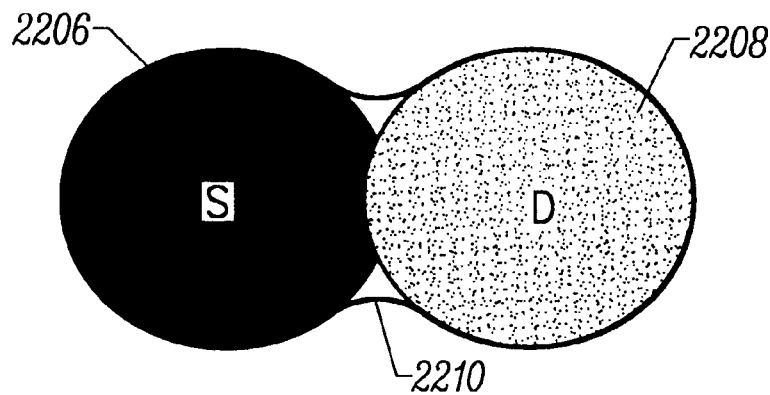
Figure 22C:
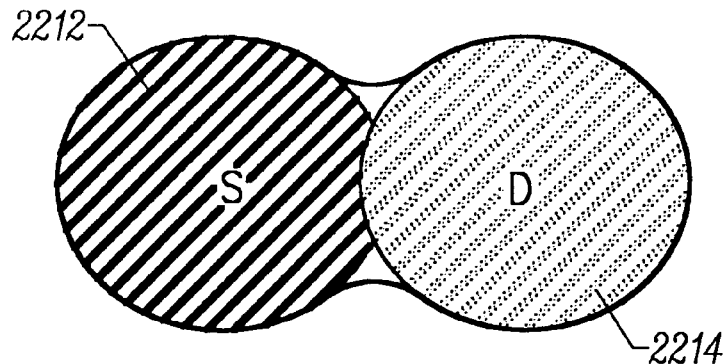
Figure 22D:
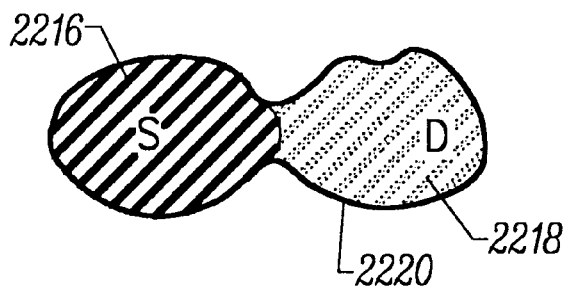

While the invention has been particularly shown and described with reference to specific embodiments thereof, it will be understood by those skilled in the art that the foregoing and other changes in the form and details may be made therein without departing from the spirit or scope of the invention. For example, it will be understood that various of the methods described above for the reduction of route generation time may be combined to realize further route generation efficiencies. This may be understood with reference to the search region representations of FIGS. 22A–D. FIG. 22A shows a comparison between the search region shapes emanating from a source location S toward a destination D for a single-ended algorithm, i.e., circular region 2202, and an A* search algorithm in which road segments are assigned heuristic costs, i.e., elliptical search region 2204. FIG. 22B shows a two-ended search with search regions 2206 and 2208 combining to cover the area enclosed by region 2210. FIG. 22C shows a two-ended search algorithm in which road segments of at least one rank have been suppressed from both ends of the search as represented by cross-hatched search regions 2212 and 2214. Finally, FIG. 22D shows a two-ended search algorithm according to a specific embodiment of the invention in which the segment rank suppression and heuristic cost features of the present invention have been combined resulting in a search area 2220, i.e., regions 2216 and 2218, which is considerably smaller than and less computationally intense than previous route generation methods. Therefore, in view of the foregoing, the scope of the invention should be determined by reference to the appended claims.

What is claimed is:

1. A method for determining a route from a first location to a second location using a vehicle navigation system, the method comprising the steps of:

searching a map database for a first number of iterations thereby generating a first route candidate connecting the first and second locations, the first route candidate comprising a plurality of road segments;

after generation of the first route candidate, terminating searching the map database after a second number of additional iterations, the second number of additional iterations resulting in at least a portion of a second route candidate beginning at the first location and comprising a plurality of road segments; and automatically selecting a best route candidate as the route without user intervention.

2. The method of claim 1 wherein the second number is determined with reference to a distance between the first and second locations.

3. The method of claim 1 wherein the second number is determined with reference to the first number.

4. The method of claim 1 further comprising the step of, where the second number of additional iterations has not yet occurred, terminating the searching step after a second number of route candidates has been generated.

5. The method of claim 1 wherein the second number is reduced by a bonus amount for each additional route candidate generated after the generation of the first route candidate.

6. The method of claim 1 wherein the searching step comprises searching the map database beginning from the first location.

7. The method of claim 6 wherein the searching step also comprises searching the map database beginning from the second location.

8. A method for determining a route from a first location to a second location using a vehicle navigation system, the method comprising the steps of:

searching a map database for a plurality of iterations thereby generating at least one route candidate, the searching initially including road segments of a plurality of ranks;

during the searching step, identifying a first road segment having a first rank associated therewith;

in response to the identifying step, excluding from subsequent iterations of the searching step all other road segments having ranks associated therewith below the first rank; and selecting a best route candidate as the route.

9. The method of claim 8 further comprising the step of executing a first number of iterations of the searching step after the first road segment is identified and before performing the excluding step.

10. The method of claim 9 wherein the first number is determined with reference to a distance between the first and second locations.

11. A method for determining a route using a vehicle navigation system, the route comprising a plurality of contiguous road segments, the method comprising the steps of:

determining whether a search region encompasses a portion of the map database characterized by a grid pattern, the grid pattern relating to a density and an orientation of road segments in the portion of the map database;

where the search region does not encompass the portion of the map database characterized by the grid pattern, expanding the search region to search the map database for the contiguous road segments, the search region being characterized by a shape and including a first plurality of route candidates; and where the search region encompasses the portion of the map database characterized by the grid pattern, altering the shape of the search region by adjusting cost values in the map database such that the search region includes additional route candidates with fewer turns as compared to the first plurality of route candidates.

12. A method for connecting a first route generated by a vehicle navigation system to a second route generated by the vehicle navigation system, the method comprising the steps of:

generating the first and second routes, the first and second routes being connected at a connection point forming a combined route;

generating a third route from a source point on the first route near the connection point to a destination point on the second route near the connection point; and replacing a portion of the combined route between the source and destination points with the third route.

13. A method for connecting a first route generated by a vehicle navigation system to a second route generated by the vehicle navigation system, the method comprising the steps of:

generating the first and second routes;

connecting the first and second routes at a connection point forming a combined route;

determining whether the first and second routes intersect at an intersection point; and where the first and second routes intersect, removing unnecessary portions of the combined route coupled to the intersection point.

14. A method for generating a partial route in a vehicle navigation system prior to generation of a complete route between an origin and a destination, the method comprising the steps of:

searching a map database to generate a plurality of partial route candidates, each of the partial route candidates having a travel cost and a heuristic cost associated therewith, each of the partial route candidates beginning at the origin and not reaching the destination;

terminating the searching step where the travel cost associated with at least one of the partial route candidates reaches a first threshold value; and selecting as the partial route one of the partial route candidates having the lowest heuristic cost associated therewith.

15. The method of claim 14 wherein the first threshold value is determined with reference to the distance between the first and second locations.

16. The method of claim 14 wherein the terminating step comprises terminating the searching step where the travel costs associated with all of the partial route candidates reach the first threshold value.

17. The method of claim 14 wherein the first threshold value is set such that a limited access road entrance is included in at least one of the partial route candidates.

18. The method of claim 17 wherein total costs associated with limited access roads are reduced to favor use of the limited access roads in route generation, the total cost comprising a sum of travel and heuristic costs associated with the limited access roads.

19. The method of claim 17 wherein a second threshold value is determined with reference to the distance between the first and second locations, and the method further comprises the step of, where the second threshold value is less than the first threshold value, truncating the at least one of the partial route candidates such that the travel cost associated therewith does not exceed the second threshold value.

20. The method of claim 14 wherein the vehicle navigation system operates in a mode in which selected travel costs are adjusted to generate adjusted travel costs for route generation purposes, the method further comprising the step of, while the vehicle navigation system is operating in the mode, keeping track of the selected travel costs for partial route termination purposes.

21. The method of claim 20 wherein the mode comprises a freeway mode in which the vehicle navigation system decreases travel costs associated with freeways to favor use of freeways for route generation.

22. The method of claim 20 wherein the mode comprises a surface street mode in which the vehicle navigation system increases travel costs associated with freeways to favor use of surface streets for route generation.

23. A method for terminating partial route generation in a vehicle navigation system, the partial route comprising a plurality of contiguous road segments stored in a map database, the method comprising the steps of:

searching the map database for the contiguous road segments;

terminating partial route generation upon selecting as part of the partial route a first road segment having access to a limited access road, the limited access road having two directions associated therewith;

identifying a second road segment in the partial route from which access to both directions of the limited access road is possible; and removing any of the contiguous road segments in the partial route beyond the second road segment.

24. A method for terminating partial route generation in a vehicle navigation system, the partial route comprising a plurality of contiguous road segments stored in a map database, the method comprising the steps of:

expanding a search region to search the map database for the contiguous road segments, the contiguous road segments including road segments of a plurality of ranks;

upon selecting as part of the partial route a first road segment comprising a portion of a first limited access road, terminating expansion of the search region along the first limited access road;

continuing expansion of the search region in at least one other direction until a second limited access road is encountered; and terminating expansion of the search region upon encountering the second limited access road.

25. A method for providing route guidance using a vehicle navigation system, comprising the steps of:

generating a route from a first location to a second location;

generating a first plurality of maneuver instructions for a first plurality of maneuvers corresponding to a first portion of the route;

communicating the first plurality of maneuver instructions via a user interface; and generating a second plurality of maneuver instructions for a second plurality of maneuvers corresponding to a remainder of the route during communication of the first plurality of maneuver instructions.

26. The method of claim 25 wherein the route comprises a first partial route from the first location to an intermediate location and a second partial route from the intermediate location to the second location, the first partial route comprising the first portion of the route, and wherein generation of the first plurality of maneuver instructions occurs before generation of the second partial route begins.

27. A method for determining a route from a first location to a second location using a vehicle navigation system, the method comprising the steps of:

searching a map database thereby generating at least one route candidate, the map database comprising a first plurality of road segments;

during the searching step, dynamically adjusting a cost associated with each of a second plurality of road segments to favor inclusion of a particular link class of road segment in the route, the second plurality of road segments comprising a subset of the first plurality of road segments; and selecting a best route candidate as the route.

28. The method of claim 27 wherein the cost associated with each of the second plurality of road segments comprises a heuristic cost which relates to the distance between the associated one of the second plurality of road segments and the second location, and a travel cost which relates to the time required to traverse the associated one of the second plurality of road segments.

29. The method of claim 28 wherein the step of dynamically adjusting the cost comprises adjusting the heuristic costs associated with each of the second plurality of road segments.

30. The method of claim 28 wherein the step of dynamically adjusting the cost comprises reducing the cost associated with each of the second plurality of road segments by a discount value, the discount value for each of the second plurality of road segments being determined with reference to the travel cost associated therewith.

* * * * *